United States Patent
Blesener et al.

(10) Patent No.: US 11,415,203 B2
(45) Date of Patent: Aug. 16, 2022

(54) ACTUATORS AND EXTERNAL CONTROLLERS THEREFOR

(71) Applicant: Power Engineering & Mfg., Inc., Blaine, MN (US)

(72) Inventors: James Lawrence Blesener, Blaine, MN (US); Amir Hooshang Amighi, Blaine, MN (US)

(73) Assignee: Power Engineering & Mfg., Inc., Blaine, MN (US)

( * ) Notice: Subject to any disclaimer, the term of this patent is extended or adjusted under 35 U.S.C. 154(b) by 0 days.

(21) Appl. No.: 17/195,278

(22) Filed: Mar. 8, 2021

(65) Prior Publication Data

US 2021/0332873 A1 Oct. 28, 2021

Related U.S. Application Data

(63) Continuation-in-part of application No. 16/429,942, filed on Jun. 3, 2019, now Pat. No. 11,236,807.

(51) Int. Cl.
*F16H 25/20* (2006.01)
*G08C 17/02* (2006.01)
(Continued)

(52) U.S. Cl.
CPC .............. *F16H 25/20* (2013.01); *G01D 5/14* (2013.01); *G08C 17/02* (2013.01); *H02K 7/108* (2013.01); *H02K 7/116* (2013.01); *H02K 11/21* (2016.01); *F16H 2025/2031* (2013.01); *F16H 2025/2071* (2013.01); *F16H 2025/2081* (2013.01); *F16H 2025/2087* (2013.01)

(58) Field of Classification Search
CPC ............. F16H 25/20; F16H 2025/2081; F16H 2025/2031; F16H 2025/2071; F16H 2025/2087; G08C 17/02; H02K 7/108; H02K 11/21; H02K 7/116; G01D 5/14
See application file for complete search history.

(56) References Cited

U.S. PATENT DOCUMENTS 4,867,000 A * 9/1989 Lentz .................. F15B 15/02
475/31
5,187,993 A * 2/1993 Nicholson ............... F16H 25/20
185/40 R
(Continued)

OTHER PUBLICATIONS

Linear Position Sensors—A Brief Guide of Use of the Most Common Type, Papoutsidakis et al., Mar. 2018 (Year: 2018).*

*Primary Examiner* — Vinh Luong
(74) *Attorney, Agent, or Firm* — Skinner and Associates; Joel Skinner

(57) ABSTRACT

An actuator for use with an external controller, either alone or in a group including other actuators controlled from the same external controller. The actuator includes a housing for encasing internal components of the device; a motor assembly for creating motion, the motor assembly being disposed within the housing; and a drive assembly for driving a pushrod, the drive assembly being arranged within the housing and slidingly connected to the motor assembly. A remote control communication circuit is electrically connected to the motor. The actuator includes an in line planetary gear and a linear position sensor. The actuator may include a hand held remote controller which utilizes tilt for proportional control, and a distributed network.

13 Claims, 35 Drawing Sheets

(51) Int. Cl.
    *G01D 5/14*     (2006.01)
    *H02K 7/116*     (2006.01)
    *H02K 7/108*     (2006.01)
    *H02K 11/21*     (2016.01)

(56) References Cited

U.S. PATENT DOCUMENTS

| | | | | |
|---|---|---|---|---|
| 2003/0214601 | A1* | 11/2003 | Yuen | H04N 5/23206 |
| | | | | 348/375 |
| 2005/0081582 | A1* | 4/2005 | Isaacs | E05B 47/0688 |
| | | | | 70/257 |
| 2010/0031714 | A1* | 2/2010 | Brown | G07C 9/00896 |
| | | | | 70/91 |
| 2015/0376929 | A1* | 12/2015 | Scheuring | F16D 41/064 |
| | | | | 74/89.38 |
| 2016/0186470 | A1* | 6/2016 | Finley | E05B 47/0012 |
| | | | | 292/339 |
| 2018/0223583 | A1* | 8/2018 | Podkopayev | E05F 15/622 |
| 2020/0131849 | A1* | 4/2020 | Campagna | H02K 29/08 |
| 2020/0353815 | A1* | 11/2020 | Barnabo | H03K 17/97 |
| 2021/0172249 | A1* | 6/2021 | Campagna | E06B 9/88 |

\* cited by examiner

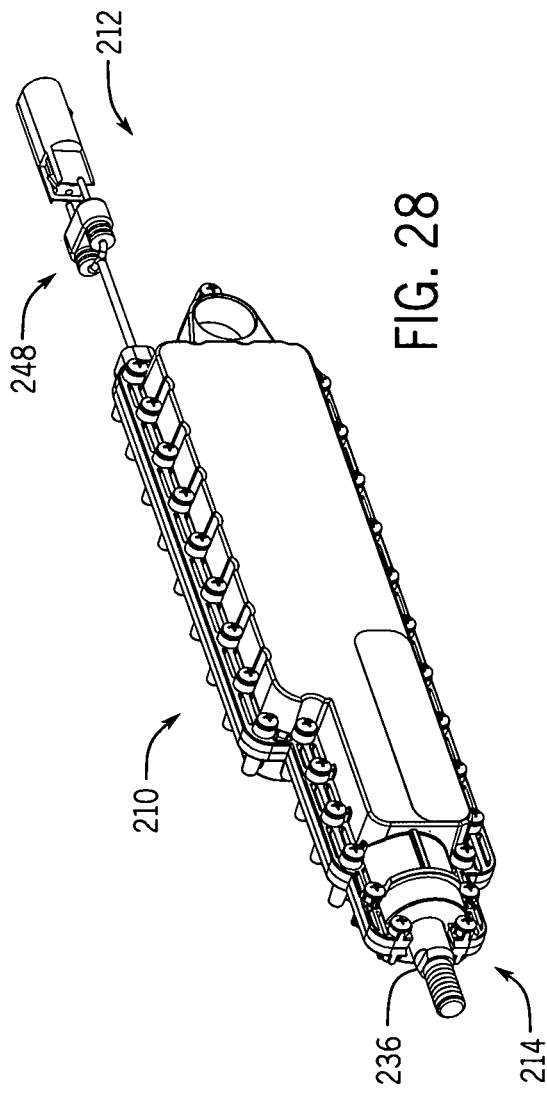
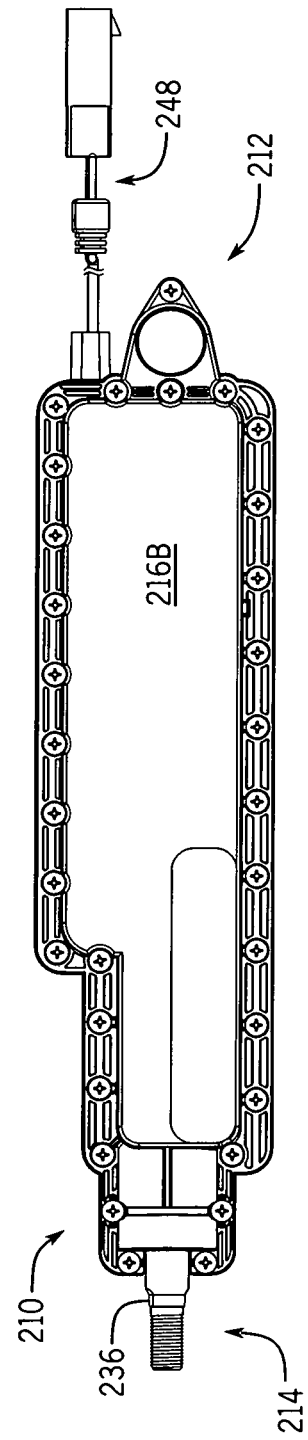

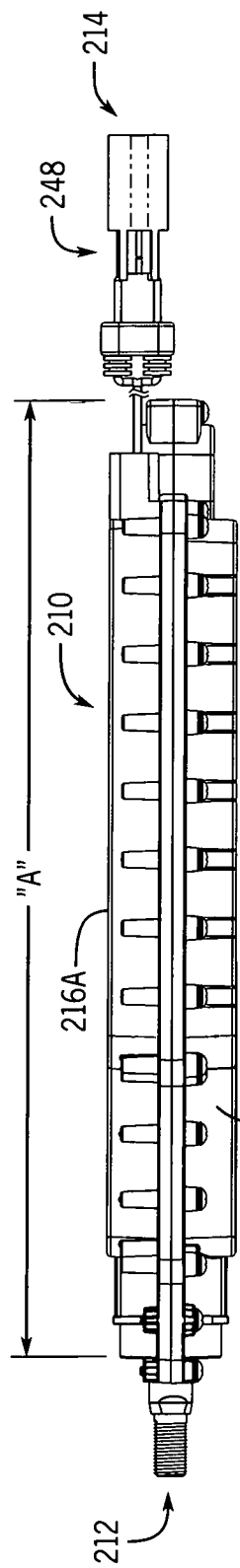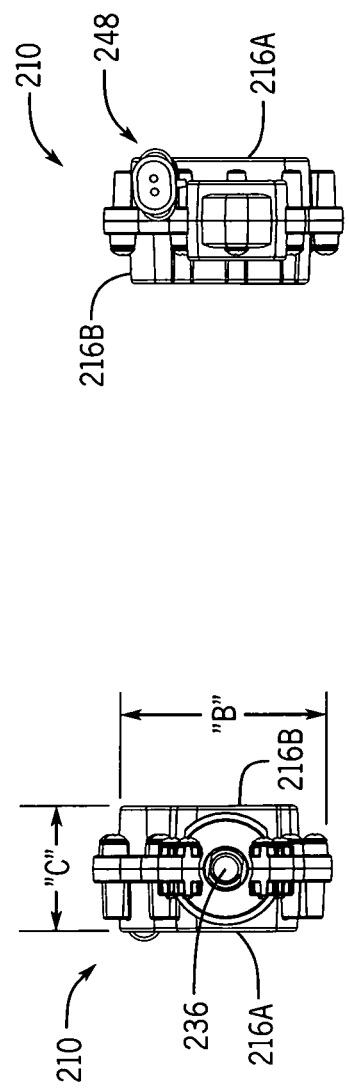
FIG. 30
FIG. 31
FIG. 32

ACTUATORS AND EXTERNAL CONTROLLERS THEREFOR

CROSS-REFERENCE TO RELATED APPLICATIONS, IF ANY

This application is a continuation-in-part of U.S. patent application Ser. No. 16/429,942, filed 3 Jun. 2019, status pending, which is hereby incorporated by reference.

37 C.F.R. § 1.71 (e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND

1. Field of the Invention

The present invention relates, generally, to electro-mechanical technology. More particularly, the invention relates to electro-mechanical actuator systems, apparatus, and methods. Most particularly, the invention relates to electronic, remote controllable actuators and remote controller therefore. The apparatus, methods and systems of the invention permit control of multiple actuators from one hand held controller, and facilitate fast and easy to addition of actuators to the group.

2. Background Information About the Prior Art

Existing technology, in general, includes apparatus and/or methods for actuation. An actuator is a device or mechanism by which a control system acts upon an environment. Actuators require a source of energy and a control signal. The control signal is relatively low energy and may be electric voltage or current, pneumatic or hydraulic pressure, or even human power. The energy source may be an electric current, hydraulic fluid pressure, or pneumatic pressure. When an actuator receives a control signal, it responds by converting the signal's energy into mechanical motion. The control system can be simple (a fixed mechanical or electronic system), software-based (e.g. a printer driver, robot control system, or the like), a human, or any other input.

It is common to control an actuator by remote control, typically a hand held remote control or controller (also called a "hand held" herein). It is also common to control multiple actuators with one controller. Typically, these controller installations include a housing with one radio frequency (RF) transmitter and multiple outputs to control multiple actuators. A shortcoming of this arrangement is that if the need arises to control further actuator(s), a new RF control box and transmitter must be added. And in some circumstances an entirely new Hand Held and Control box are needed to add a single actuator to an existing installed system. Adding control of further actuators is burdensome and expensive.

Referring to FIGS. 44 and 45, in the past, hydraulic actuator manufacturers provided multiple options for systems. If the end user wanted to control one (1) hydraulic function, for example a winch, the customer would buy only what they needed at the lowest cost possible. This would typically be a two (2) function remote, box and actuator. An example of this is shown in FIG. 44. This would allow extend and retract functions from the remote to be commanded to the box. The box would then be integrated to some hydraulic control for extend and retract. If the user wanted six (6) functions to control three (3) hydraulic devices the user would purchase a system shown for example in FIG. 45. A similar system would be provided if one wanted to control twelve (12) functions or six (6) hydraulic devices. These implementations suffered from several problems. Firstly, the user needed to know specifically what he or she wanted to accomplish when the system was initially purchased. If one wanted to change functions later, the initial system was ineffective and a new system needed to be acquired. The prior art systems are inherently not expandable.

A second problem is that the prior art systems do not allow proportional control to meter the hydraulic fluid. The subject control button sends an extend or retract command. It does not send a smart command to run to a position, A third problem is that every distributor buying prior art systems typically has multiple hand held, control box and other parts numbers. Systems of the prior art do not allow easy and flexible sales, integration and upgrade. Further, but not necessarily the last problem, is that the prior art systems have multiple cables running back to the control box.

This technology is believed to have significant limitations and shortcomings. For these and other reasons, a need exists for the present invention.

All US patents and patent applications, and all other published documents mentioned anywhere in this application are hereby incorporated by reference in their entirety

BRIEF SUMMARY

The present invention provides an actuator apparatus and methods which are practical, reliable, accurate, and efficient, and which are believed to fulfill a need and to constitute an improvement over the background technology.

1. Actuator Having Idler Gears, Rotary Position Sensor, and Plural Processors

In contrast to the one hand held box (controller and housing) with one RF module dedicated to control one or more actuators, the present invention involves constructing each actuator with its own unique RF control system and controller pairing protocol. This allows one standard hand held controller with multiple control buttons to control one or more actuators, and to make pairing of controller to actuator easy and reliable. If control of a second or further actuator is needed or desired, a large update is not needed. The user simply adds the actuator, pairs the new actuator to the hand held controller and the system is ready to use.

Another aspect of the invention involves pairing accuracy. Communication between hand held controller and actuator normally takes place via sub Ghz. RF. Sub Ghz RF permits longer range communication. However, if a hand held controller is addressed to an actuator using such sub Ghz RF transmission, the possibility exists of pairing of the controller with an intended actuator that is located a long distance away, for example approximately 50 feet or more away, and not the actuator (typically closer to the user) that the user intended to pair with. The present invention therefore adds Ghz RF transmission means, which is used during pairing so that the user can limit and control can better limit the distance locally for pairing accuracy.

A further aspect of the invention involves increase reliability and safety of operation. In many work environments in which remote controllable actuators are used, the use of microprocessors with firmware is considered a high risk. A single point processor failure can cause unintended motion and possibly an unintended and unsafe operation. The present invention therefore utilizes a second processor in a specific mode of operation to oversee and enable operation. Thus two (2) processor failures would be required to permit an unintended operation.

In one aspect, the invention provides a remotely controllable linear actuator which includes:

an electric motor for creating rotary motion;

a transmission connected to the motor, the transmission comprising a plurality of gears, a linear drive assembly connected to the transmission, the linear drive assembly comprising a rotary to linear converter communicatively connected to at least one transmission gear, and a linear output shaft connected to the rotary to linear converter, the linear output shaft being adapted to be connected to an external element; and a remote control communication circuit communicatively connected to the motor, the remote control communication circuit comprising a short range transmitter/receiver for pairing the actuator to an external control device and a longer range transmitter/receiver for communicating operational control signals between the external control device and the actuator.

In another aspect, the linear actuator further includes:

a first processor communicatively connected to the remote control communication circuit, the primary processor: (a) receives motor control commands from the external controller; and (b) controls the speed and direction of the motor based on the motor control commands; and a second processor which is communicatively connected to the primary processor and to the remote control circuit, the second processor (a) receives motor control commands from the first processor, (b) receives motor control commands from the remote control communication circuit, and (c) enables control of the speed and direction of the motor, if the motor control commands received from the first processor match the motor control commands received from the remote control communication circuit.

In a still further aspect, the linear actuator further includes:

a spring centering mechanism, the spring centering mechanism placing the output shaft to center neutral position when power in the absence of power being applied to the linear actuator; and the first processor has an output which terminates power consumption after a predetermined time period.

2. Actuator Having in Line Planetary Gear, Linear Position Sensor, and Single Processor In contrast to the one hand held box (controller and housing) with one RF module dedicated to control one or more actuators, the present invention involves constructing each actuator with its own unique RF control system and controller pairing protocol. This allows one standard hand held controller with multiple control buttons to control one or more actuators, and to make pairing of controller to actuator easy and reliable. If control of a second or further actuator is needed or desired, a large update is not needed. The user simply adds the actuator, pairs the new actuator to the hand held controller and the system is ready to use.

Another aspect of the invention involves pairing accuracy. Communication between hand held controller and actuator normally takes place via sub GHz. RF. Sub GHz RF permits longer range communication. However, if a hand held controller is addressed to an actuator using such sub Ghz RF transmission, the possibility exists of pairing of the controller with an intended actuator that is located a long distance away, for example approximately 50 feet or more away, and not the actuator (typically closer to the user) that the user intended to pair with. The present invention therefore adds Ghz RF transmission means, which is used during pairing so that the user can limit and control can better limit the distance locally for pairing accuracy.

In one aspect, this embodiment of the invention provides a remotely controllable linear actuator which includes:

an electric motor for creating rotary motion;

a transmission connected to the motor, the transmission comprising a plurality of gears, a linear drive assembly connected to the transmission, the linear drive assembly comprising a rotary to linear converter communicatively connected to at least one transmission gear, and a linear output shaft connected to the rotary to linear converter, the linear output shaft being adapted to be connected to an external element; and a remote control communication circuit communicatively connected to the motor, the remote control communication circuit comprising a short range transmitter/receiver for pairing the actuator to an external control device and a longer range transmitter/receiver for communicating operational control signals between the external control device and the actuator.

3. Multi-Function Hand Held Controller

The present invention solves the problems inherent in the Prior Art two and six function controller systems. The controller of the present invention provides twelve (12) functions.

The aspects, features, advantages, benefits and objects of the invention will become clear to those skilled in the art by reference to the following description, claims and drawings.

BRIEF DESCRIPTION OF THE SEVERAL VIEWS OF THE DRAWING

The present invention, and the manner and process of making and using it, will be better understood by those skilled in the art by reference to the following drawings.

FIG. 28 is a perspective view of an alternative embodiment of an actuator of the invention, having an in-line planetary gear, a linear position sensor, and a single processor.

FIG. 29 is a front elevation view of the actuator of FIG. 28.

FIG. 30 is a top view thereof.

FIG. 31 is a distal end view thereof.

FIG. 32 is a proximal end view thereof.

DETAILED DESCRIPTION

1. Actuator Having Idler Gears, Rotary Position Sensor, and Plural Processors

FIGS. 1-5 show the exterior of a first embodiment of an actuator 10 of the invention. The actuator 10 is compact, efficient, accurate, and reliable. The actuator 10 has a substantially rectilinear housing 12 that protects and serves as a base for various internal mechanical and electrical components. At one end, a mechanical output rod 14 exits the housing 12 at an aperture there though. A port 16 is shown disposed at the same end as the output rod 14, and provides power to the actuator 10 and in some embodiments may provide control connections. Although the rod 14 is shown to have a curvilinear configuration, it is within the purview of the invention that it may have a rectilinear or other configuration or geometry. Similarly, the power and control port 16 may have various other configurations. As will be described further below, this embodiment of the invention includes, but is not limited to, idler gears, a rotary position sensor, and plural processors.

Figure 1:
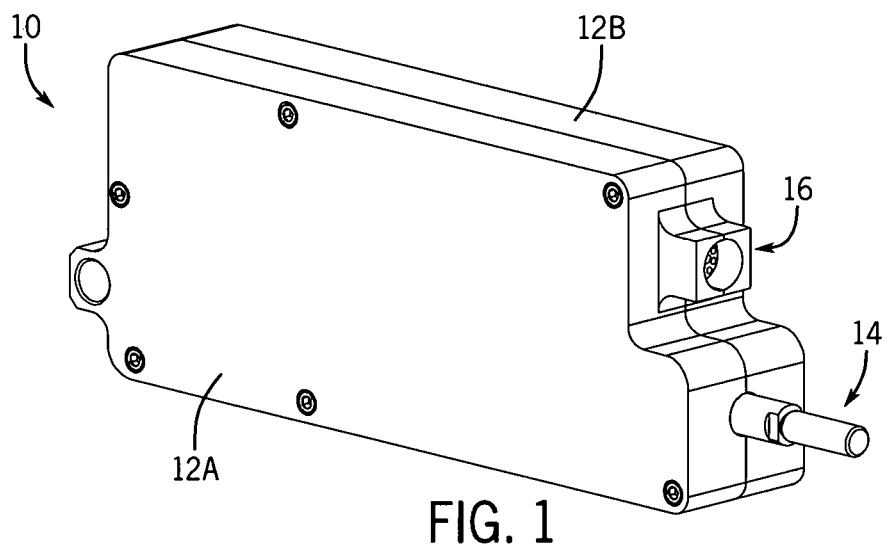
FIG. 1 is a perspective view of a first embodiment of an actuator of the invention.
Figure 2:
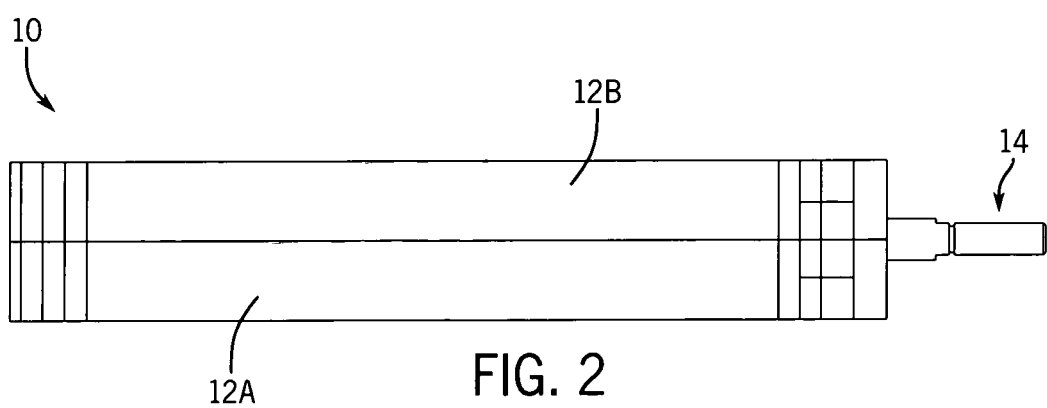
FIG. 2 is a top view, relative to FIG. 1, of the actuator.
Figure 3:
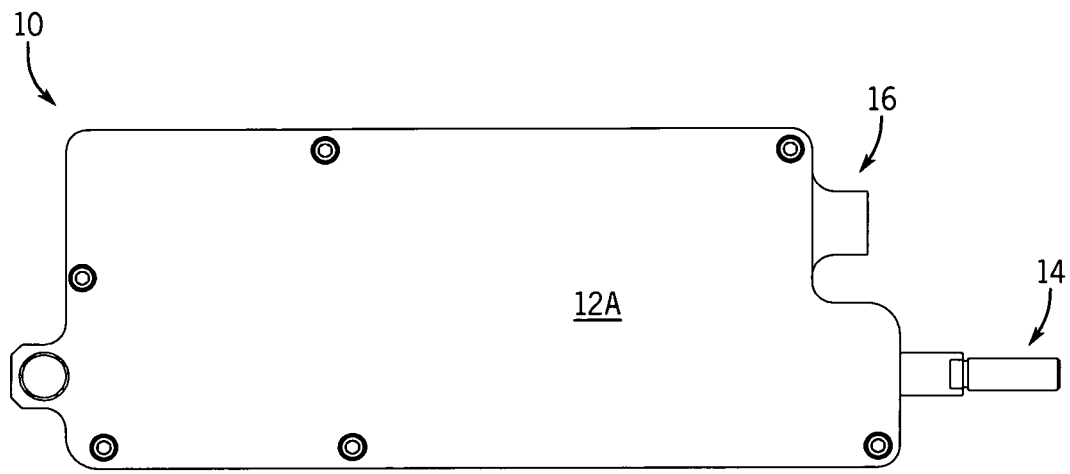
FIG. 3 is a side elevation view, again relative to FIG. 1, of the actuator. The opposite side view is substantially a mirror image of this view.
Figure 4:
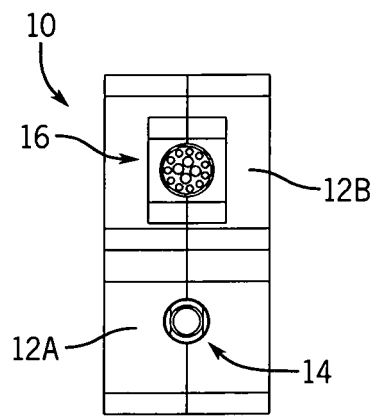
FIG. 4 is a front or distal end view of the actuator.
Figure 5:
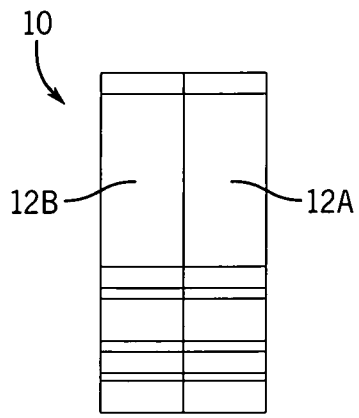
FIG. 5 is a back or proximal end view of the actuator.
Figure 6:
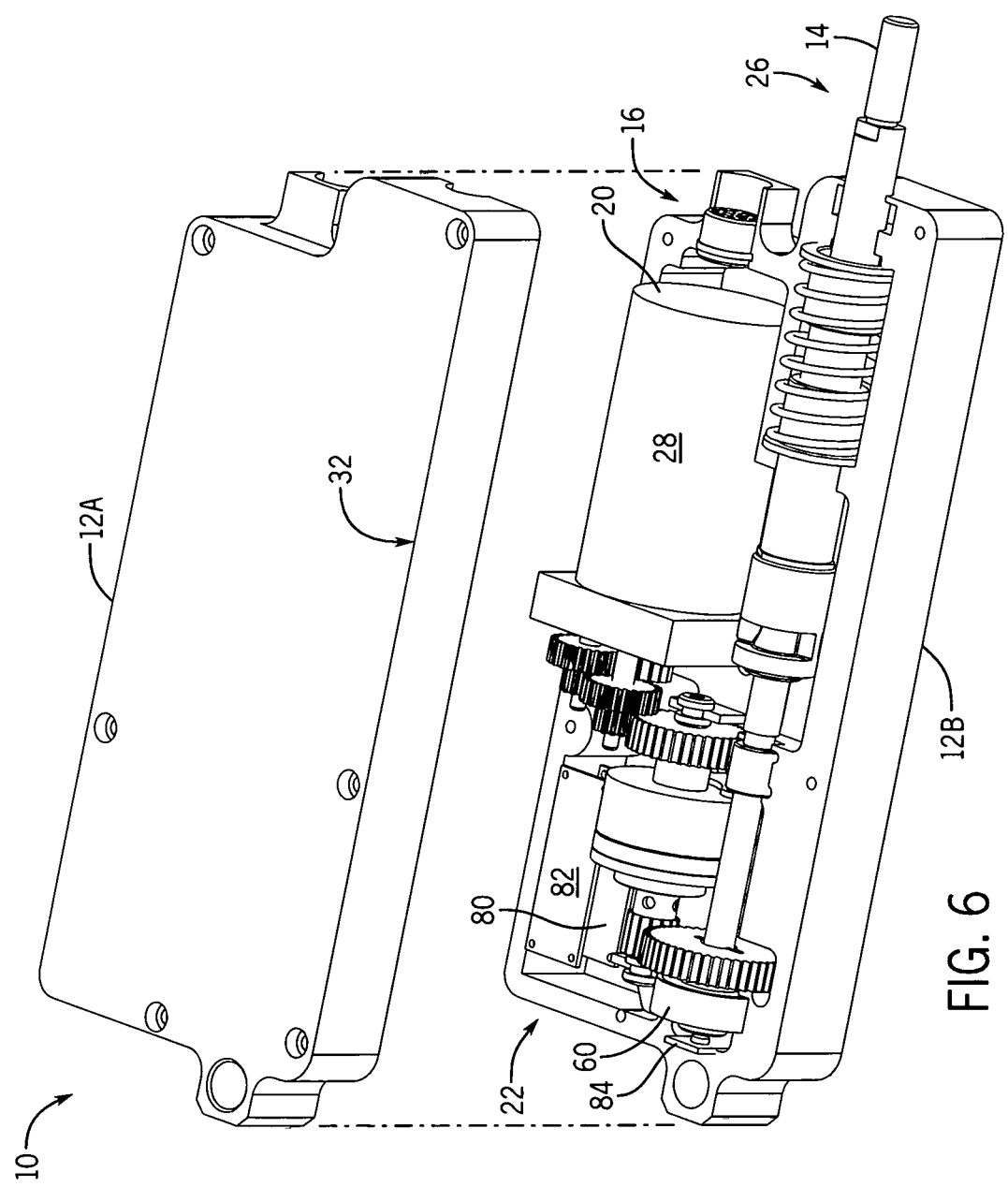
FIG. 6 is a perspective view of the actuator with its housing parts separated to reveal interior components thereof.
Figure 7:
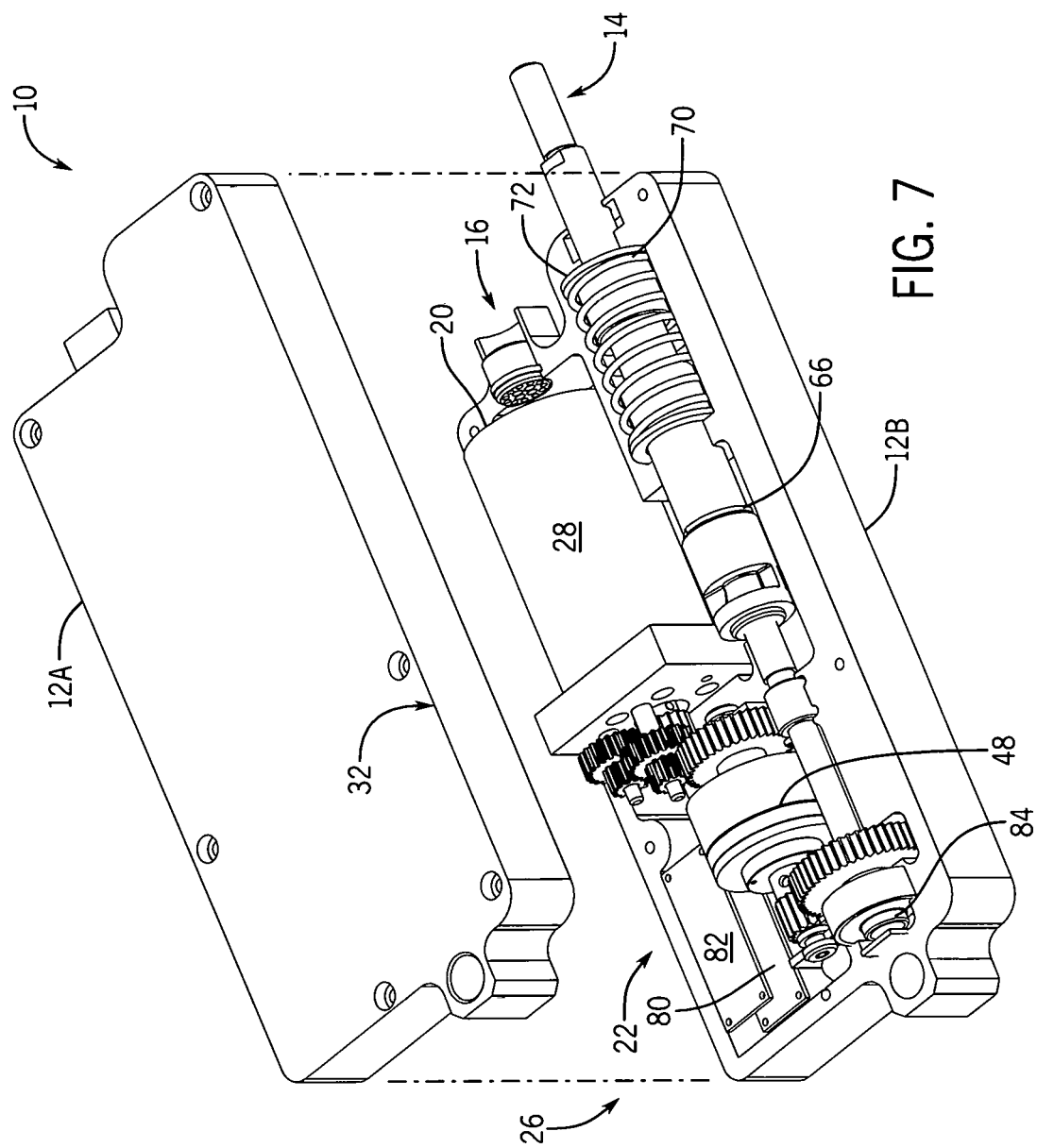
FIG. 7 is a further perspective view of the actuator with the housing parts separated to reveal a slightly different view of the interior components.
Figure 8:
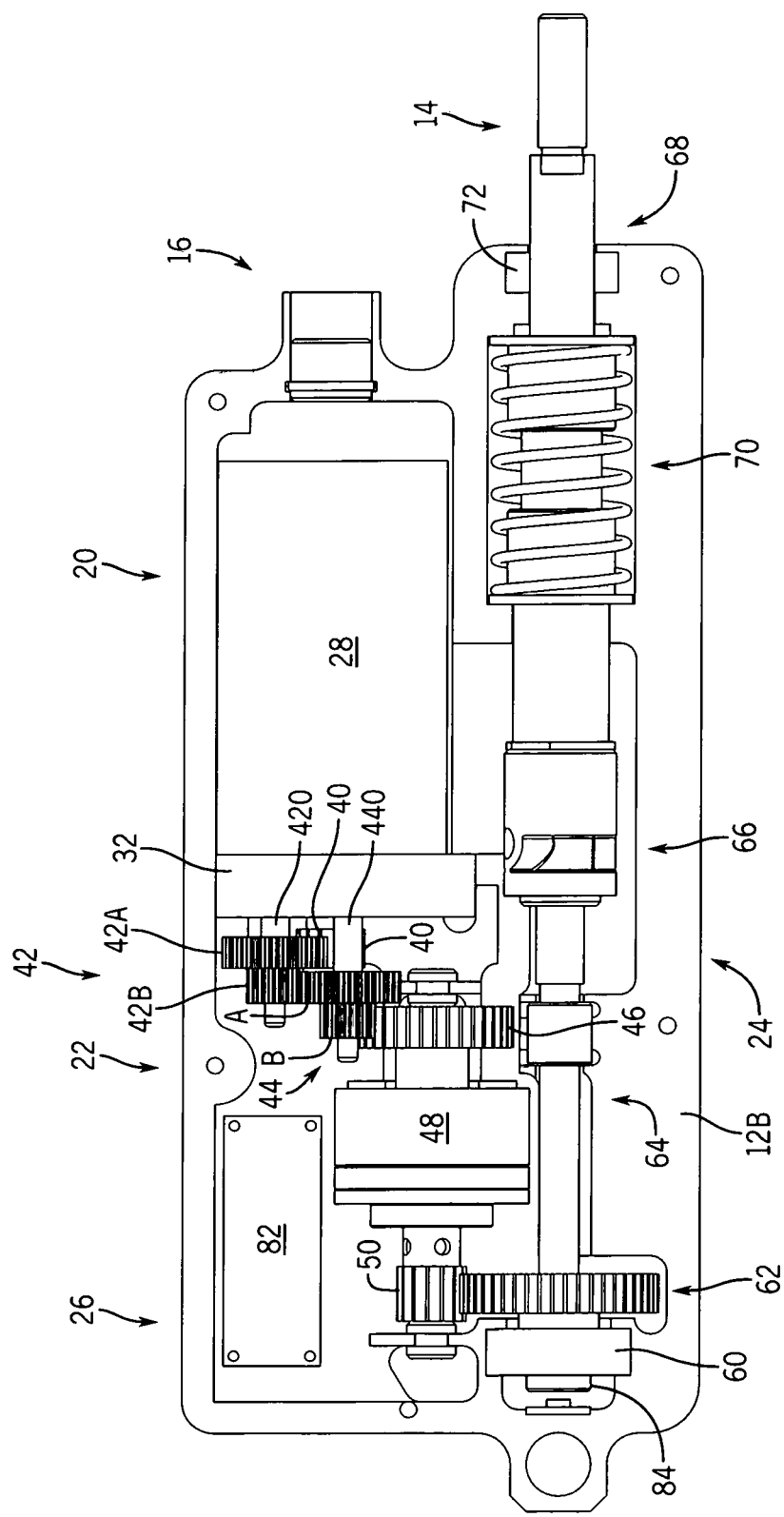
FIG. 8 is a side elevation view of the actuator with one of one housing part removed, showing internal components of the actuator.
Figure 9:
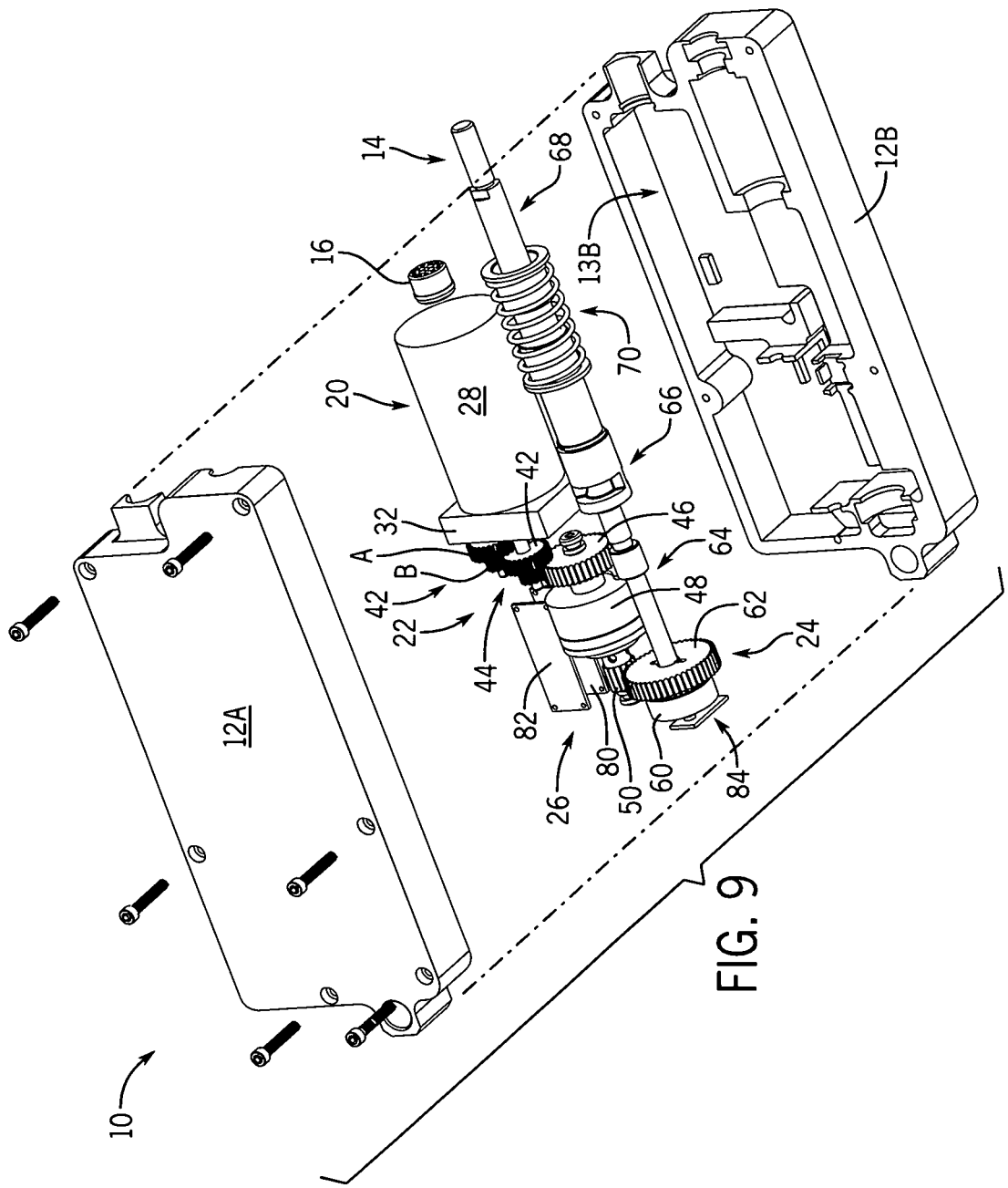
FIG. 9 is a partially exploded view of the actuator.
Figure 10:
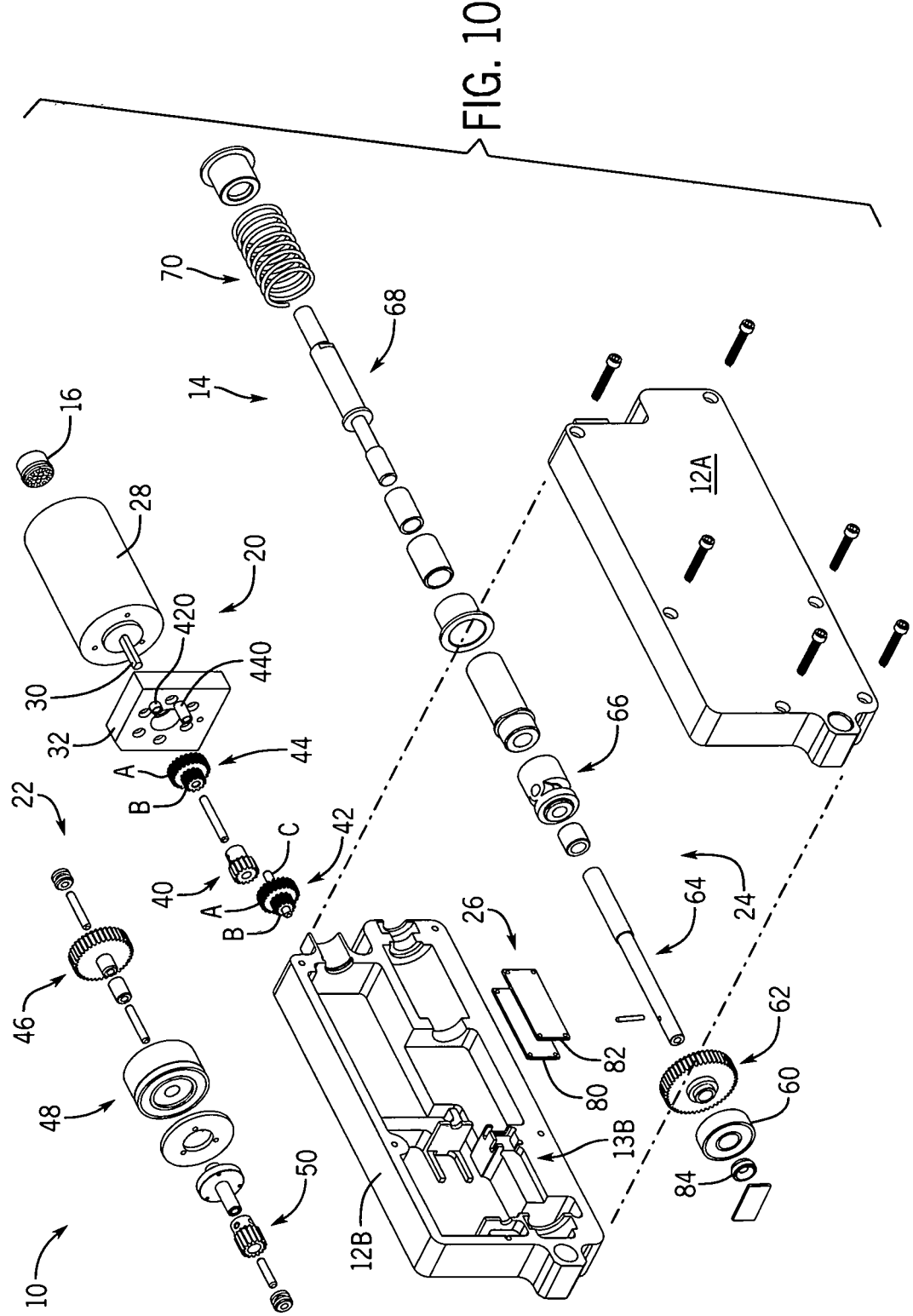
FIG. 10 is a fully exploded view of the actuator.
Figure 11:
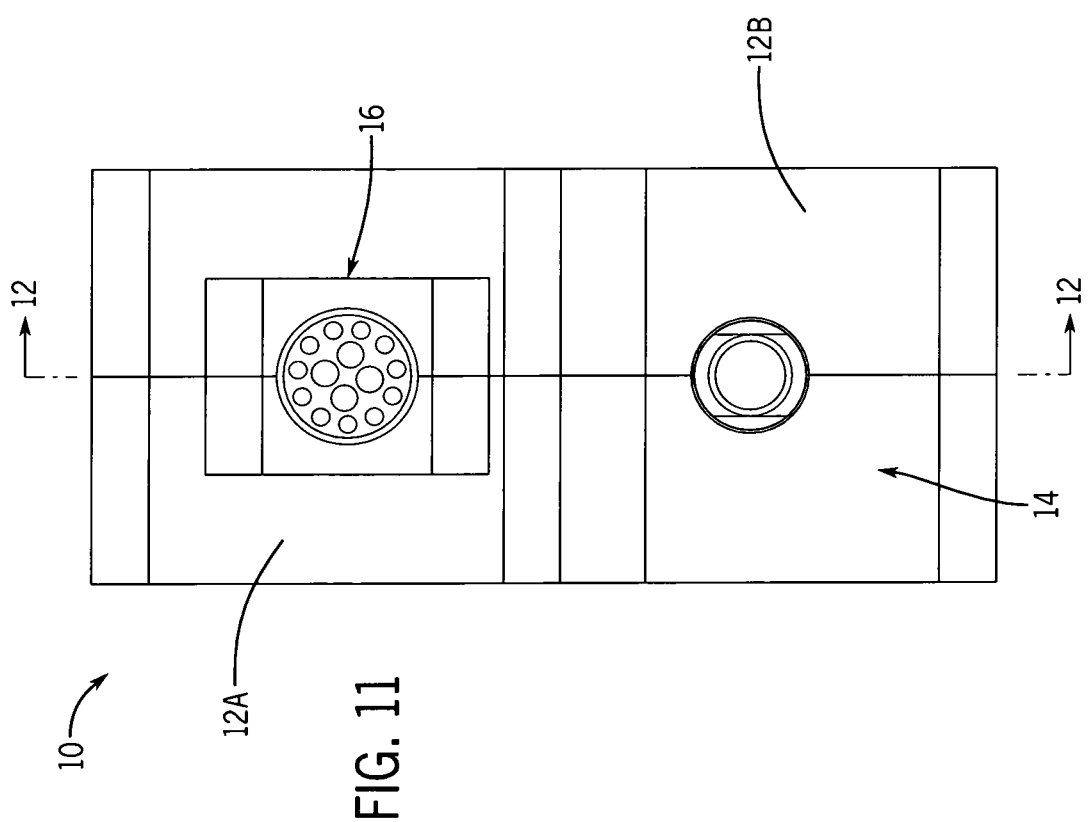
FIG. 11 is a further front or distal end view of the actuator.
Figure 12:
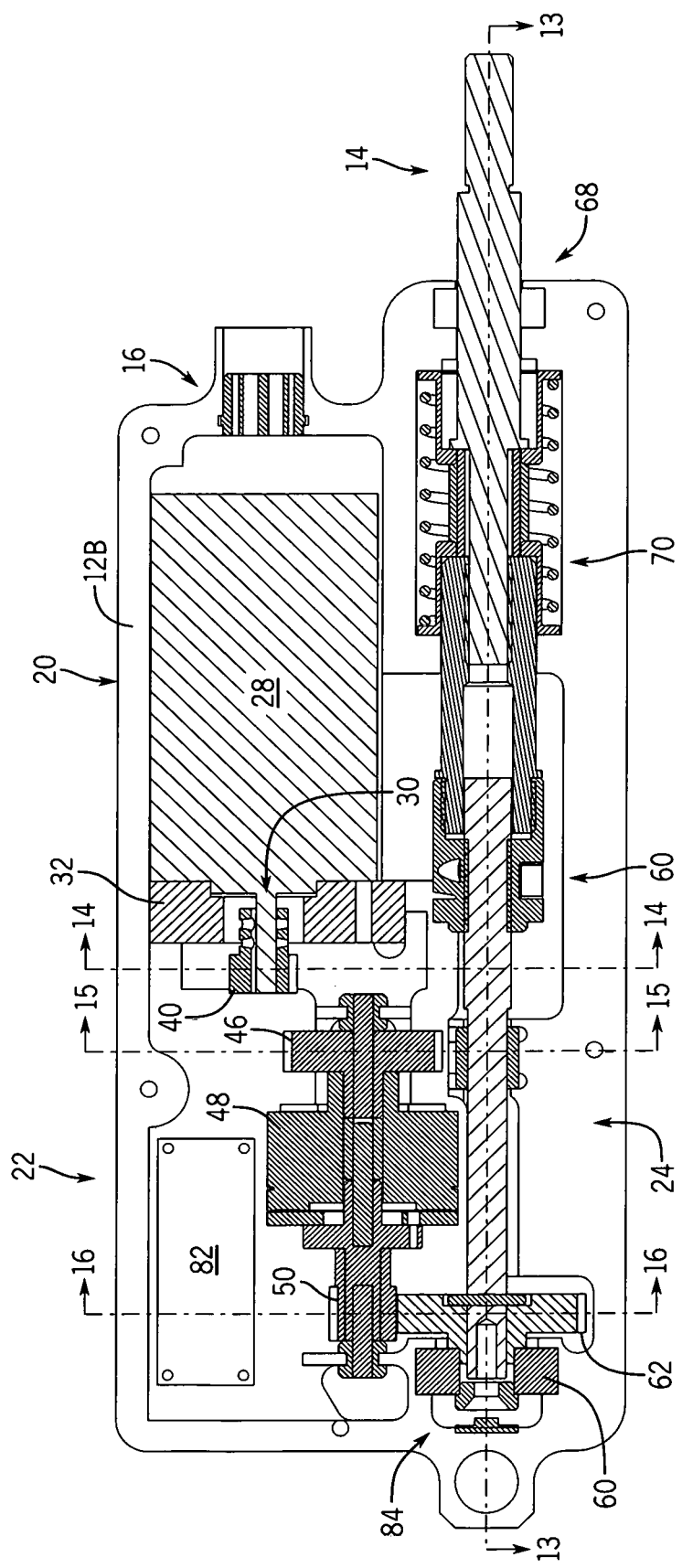
FIG. 12 is a longitudinal cross-sectional view of the actuator taken at line 12-12 of FIG. 11.
Figure 13:
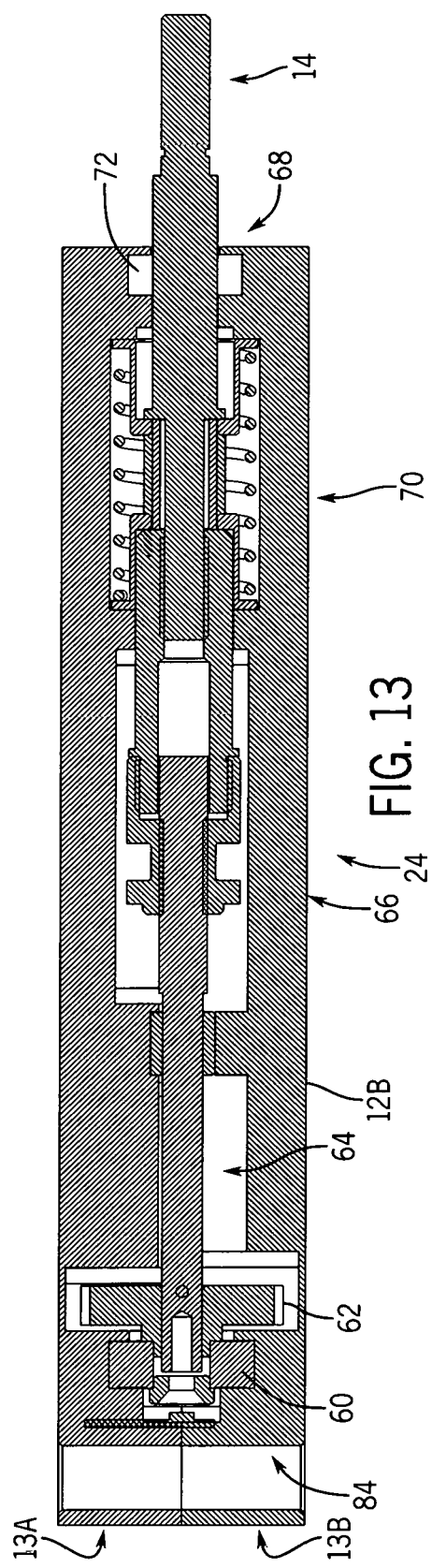
FIG. 13 is a longitudinal cross-sectional view of the actuator taken at line 13-13 of FIG. 12.
Figure 16:
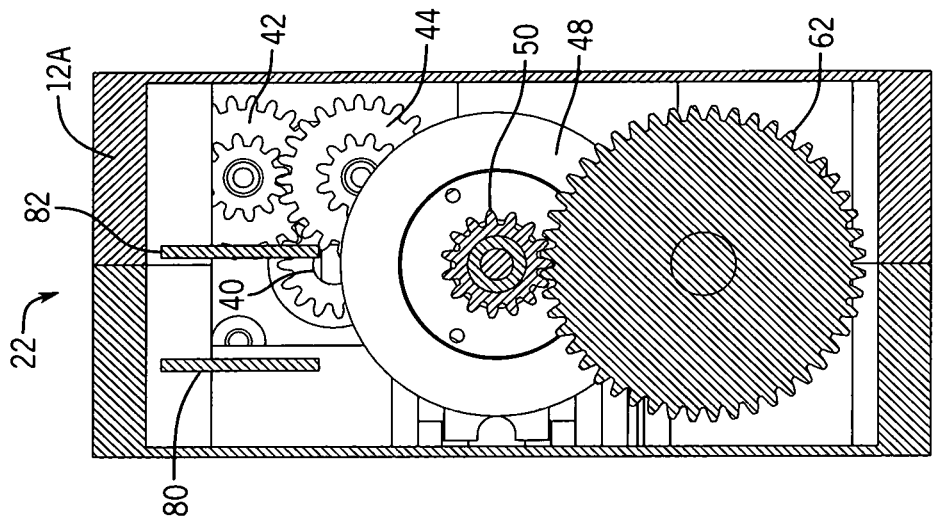
FIG. 16 is a transverse cross-sectional view of the actuator taken at line 16-16 of FIG. 12.
Figure 15:
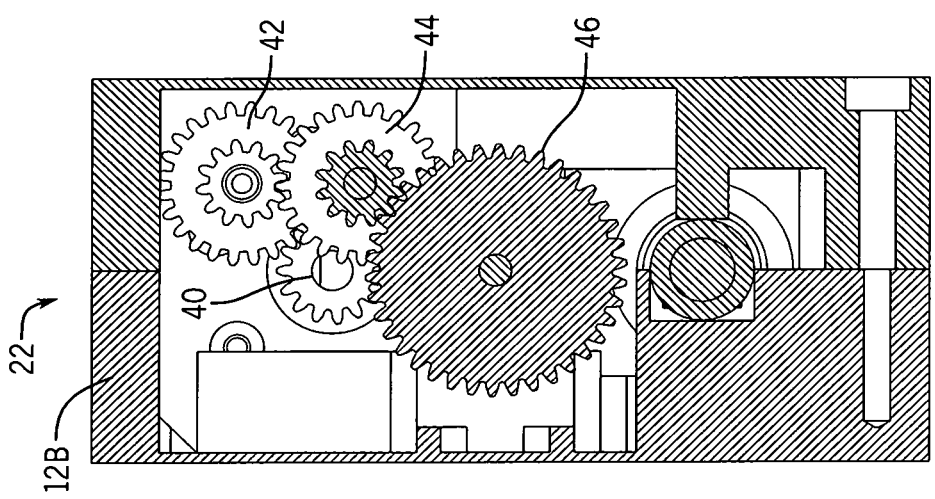
FIG. 15 is a transverse cross-sectional view of the actuator taken at line 15-15 of FIG. 12.
Figure 14:
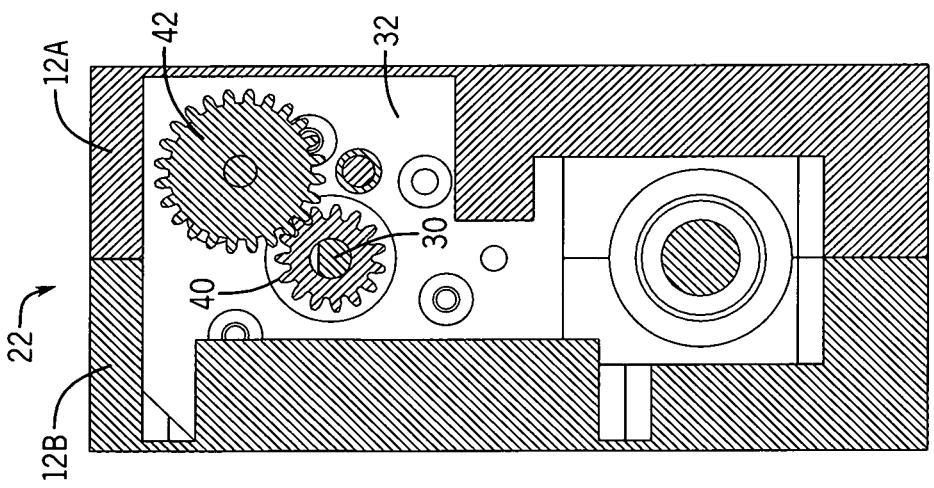
FIG. 14 is a transverse cross-sectional view of the actuator taken at line 14-14 of FIG. 12.

Turning to FIGS. 6 and 7, the actuator 10 housing 12 preferably consists of two halves 12A and B. Internally, the actuator 10 primarily comprises a motor assembly 20, a transmission assembly 22, a linear drive assembly 24, and an electronic control assembly 26. The power port 16 is electrically communicatively connected to the motor assembly 20. The electronic control assembly 26 is also electrically communicatively connected to the motor assembly 20. The motor assembly 20 is mechanically communicatively connected to the transmission 22, which in turn is mechanically coupled to the linear drive 24. The output of the linear drive assembly 24 is the output rod 14.

The housing 12 is molded to securely support all moving interior components when both halves are sealingly coupled together, preferably by fasteners such as bolts or screws. The electrical connector 16 is exposed to the exterior of the housing 12 and is electrically connected to the motor assembly 20. The motor assembly 20 transfers rotational motion to the transmission 22. The transmission 22 transfers rotational motion to the linear drive assembly 24. The linear drive assembly 24 converts rotational motion from the transmission 22 to linear motion which is output to the pushrod 14. The pushrod 14 is in communication with the exterior of the housing 12. The electronic control assembly 26 is communicatively connected to the motor assembly 20 and to the linear drive assembly 24 and enables precise, consistent control of the actuator 10.

Referring also to FIGS. 8 to 16, the motor assembly 20 includes a motor 28, preferably a DC motor. It may be brush or brushless type. The motor 28 is fixedly supported with respect to the housing by a motor mount 32. Motor mount 32 is fixedly coupled to the housing 12. A motor shaft 30 extends outwardly from end of the motor 28 opposite that of the power connector 16. The motor assembly 20 is communicatively connected to the transmission assembly 22. The principle parts of the transmission assembly 22 include a plurality of gears and a clutch. Motor shaft 30 is coupled and rotates a first, motor gear 40. First gear 40 is connected to and transmits rotational motion to a second, idler, gear 42. Second gear 42 is preferably a compound gear, the larger diameter, major component A thereof meshes with the first gear 40. The smaller diameter, minor gear B of second gear 42 meshes with and transmits rotational motion to a third gear 44. The second gear 42 is mounted to and extends from motor mount 32 via shaft 42c. Third gear 44 is also preferably a compound gear having larger major A and smaller minor B components. The larger diameter component A of a third gear 44, meshes with the smaller gear B of second gear 42. The smaller component B of third gear 44 meshes with and transmits rotational motion to a fourth gear 46. The third gear 44 is also mounted to and extends from motor mount 32 via shaft 44c. Fourth gear 46 is attached to an input shaft 49A of a clutch mechanism 48. Clutch mechanism 48 has an output shaft 49B on which is mounted a fifth gear 50. The aforementioned elements are disposed consecutively, away from motor 28. The clutch 48 manages engagement of the upstream motor assembly 20 with the linear drive assembly 24, which is oriented back towards the upstream end of the actuator, generally parallel to the motor assembly 20.

The fifth gear 50 of the clutch 48 meshes with and transmits rotational motion to a sixth, input gear 62, which is part of the linear drive assembly 24. A bearing assembly 60 is fixedly coupled to the housing 12 downstream, relative to the motor assembly 20, from the fifth gear 50. A proximal end of a first shaft assembly 64 of the drive assembly 24 is rotatably coupled to the bearing assembly 60. The distal end of the first shaft assembly 64 is connected to a drive nut 66. Drive nut 66 converts rotational motion of the first shaft assembly 64 to linear motion (extend, retract, stop, or go to an absolute position) of a second shaft assembly 68, connected to the opposite, distal, end of the drive nut 66. A spring centering mechanism 70 is disposed about the second shaft assembly 68 and within a cylindrical cavity of the housing 12 at a distal end of the drive assembly 24. The self centering spring design ensure that when no power is applied, the actuator 10 returns to a center neutral position. The distal end of the second shaft assembly 68 is connected to the pushrod 14, which protrudes through a rod seal 72 to the exterior of the housing 12. The two part shaft assembly 64/68 allows spinning without the risk of breaking the nut 66 and spring return 70.

The electronic control assembly 26 includes a motor controller 80 (preferably in the form of a card), a radio transmitter/receiver card 82, and a position sensor 84. The controller 80 and transmitter 82 are preferably constructed on printed circuit boards (PCBs) in the form of compact cards. They are disposed opposite the proximal end of the drive assembly 24. The motor controller 80 is electrically communicatively connected to the motor 28, and a position sensor 84. The controller 80 has hardware means to start and stop the motor 28 based on information received about the rotational position of the first shaft assembly 64 from the position sensor 84. The position sensor 84 is preferably a magnetic, non-contact type sensor and is disposed at the very end of the proximal end of the first shaft assembly 64. The position sensor may alternatively be connected through gearing. For example, if the shaft 64 rotates 10 times gears may limit rotation less than one revolution allowing true position calculation. The transmitter/receiver 82 is electrically communicatively connected to the motor controller 80 and provides a means of operating actuator 10 via a remote control device, for example a handset. The transmitter/receiver 82 is preferably a radio frequency (RF) type device.

Figure 17:
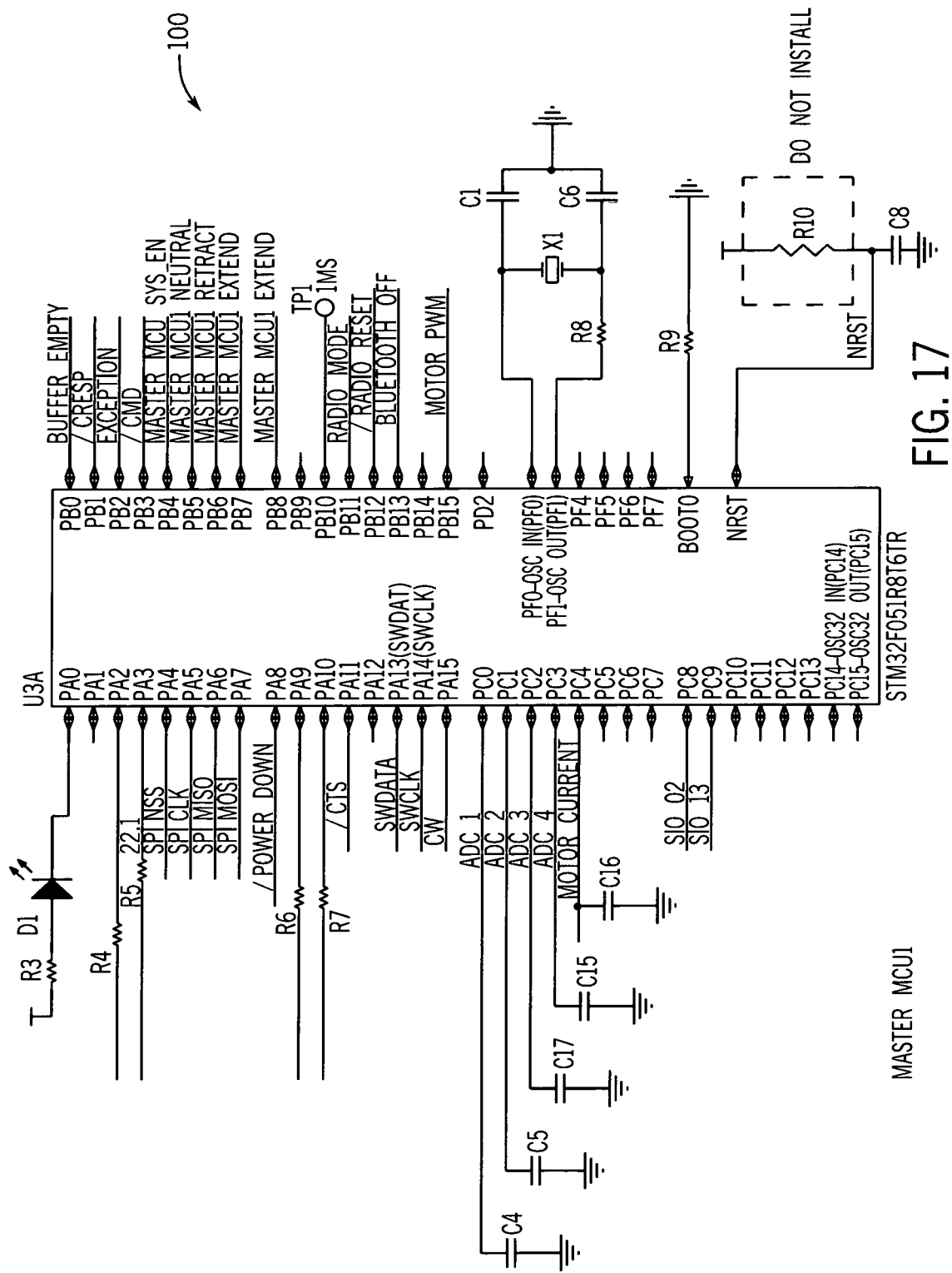
FIG. 17 is a schematic circuit diagram of a first block of an embodiment of a master microcontroller section of a Radio Receiver Board (PCB) of the system.
Figure 18:
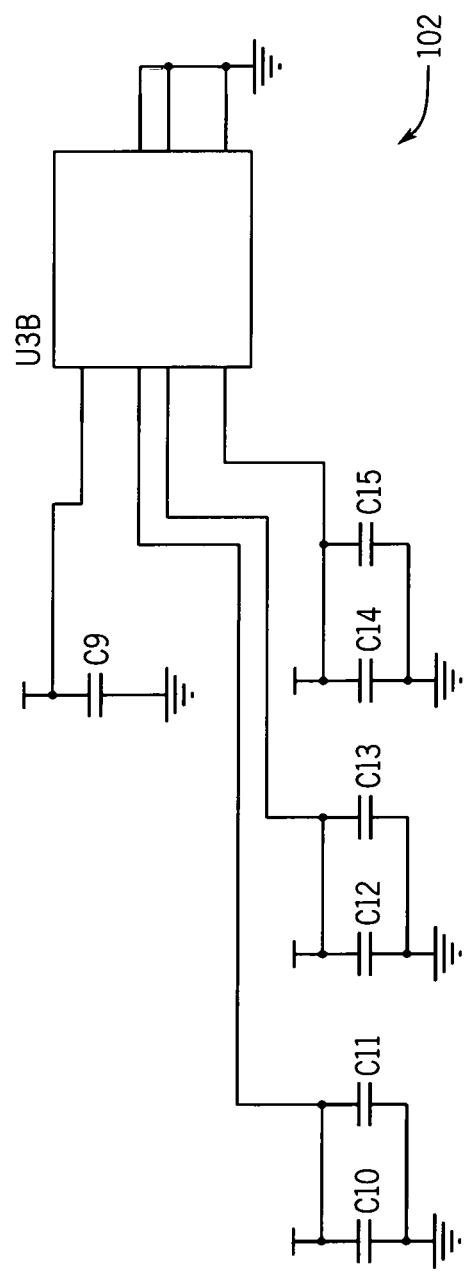
FIG. 18 is a schematic circuit diagram of a second block of the master microcontroller section.
Figure 19:
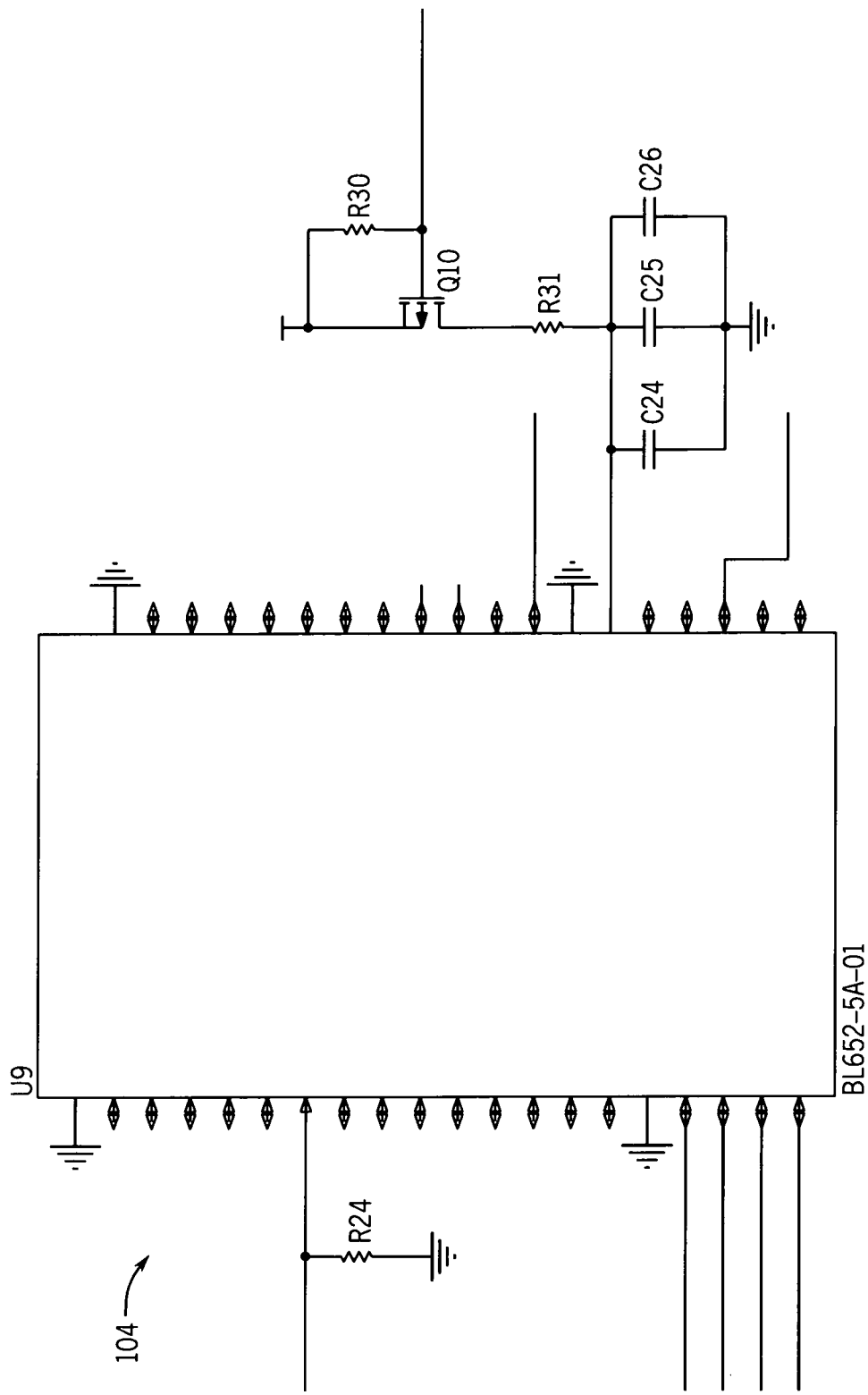
FIG. 19 is a schematic circuit diagram of a short range Ghz section of the Radio Receiver Board.
Figure 20:
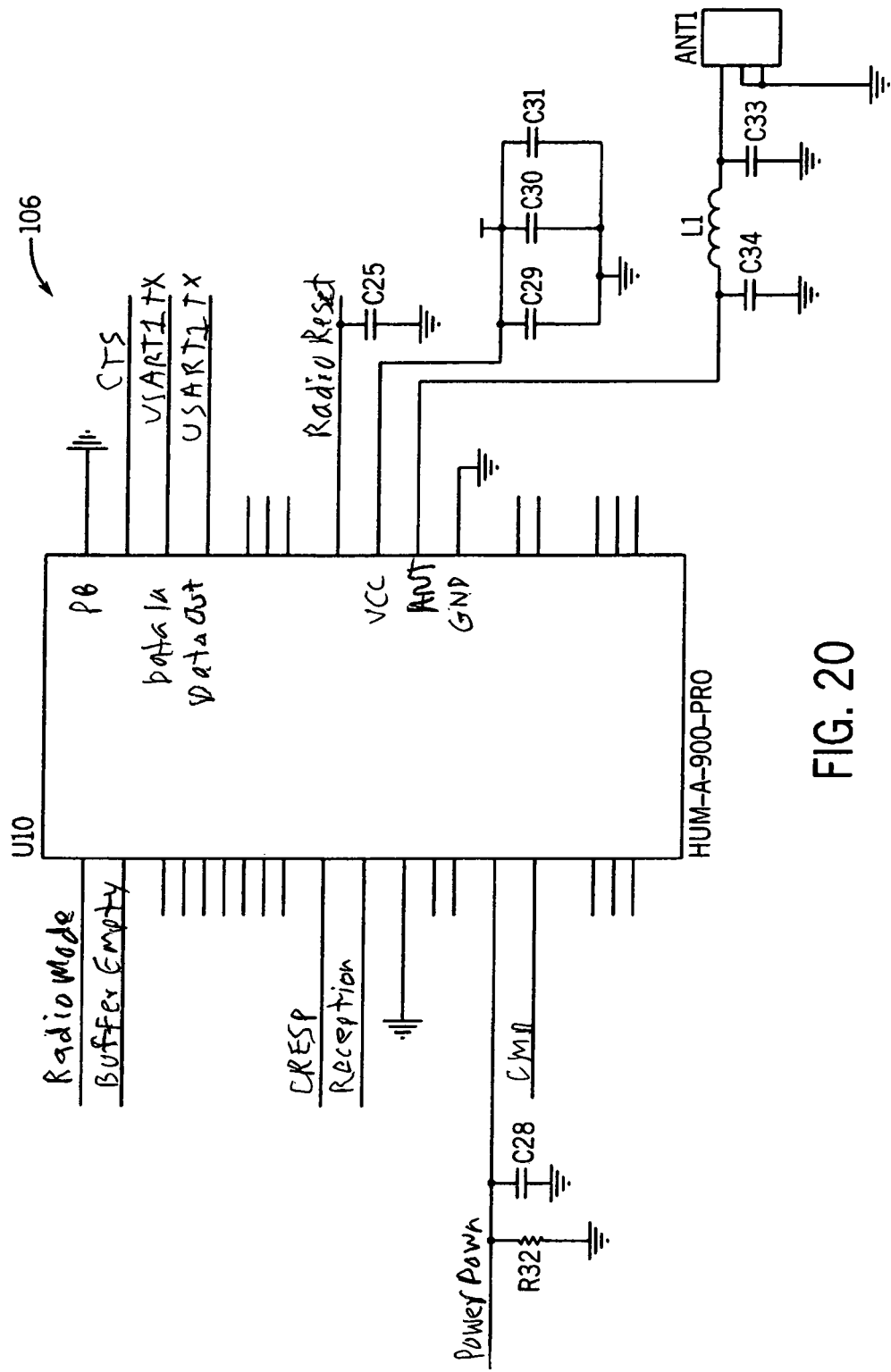
FIG. 20 is a schematic circuit diagram of a long range Sub Ghz section of the Radio Receiver Board.
Figure 21:
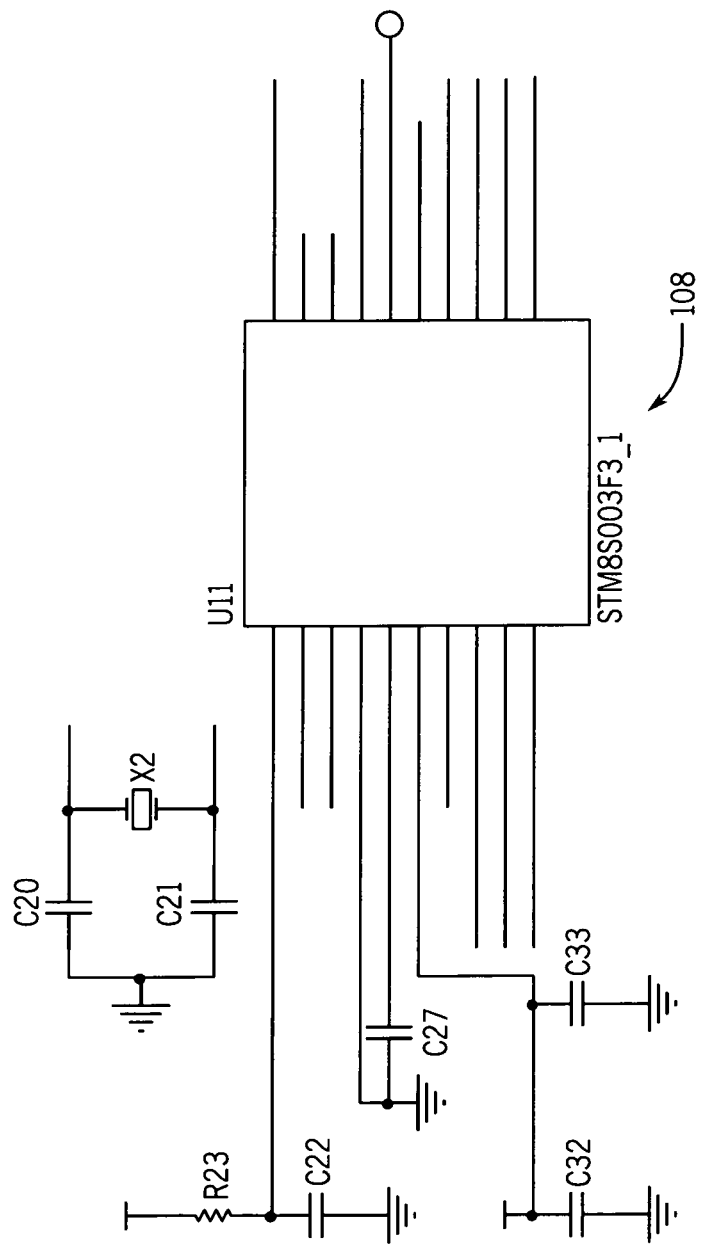
FIG. 21 is schematic circuit diagram of a safety backup microcontroller section of the Radio Receiver Board.
Figure 22:
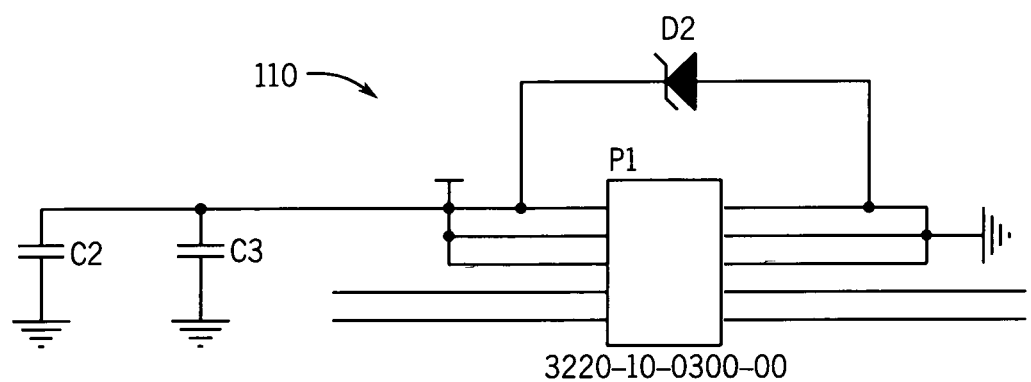
FIG. 22 is a schematic circuit diagram of a power connector of the Radio Receiver Board.
Figure 23:
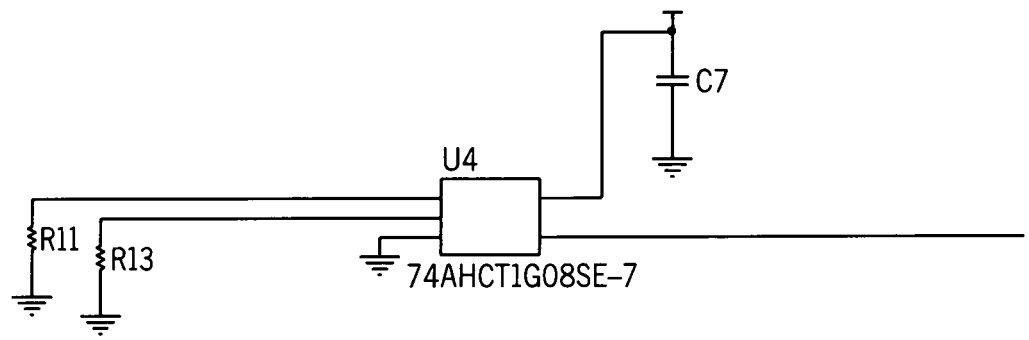
FIG. 23 is a schematic circuit diagram of a dual processor safety enable of the Radio Receiver Board.

FIGS. 17-23 are schematic circuit diagrams of various modules, sections or blocks of an embodiment of the Radio Receiver Board 82 of the system. FIGS. 17 and 18 are first and second modules 100 and 102 of a master or primary microcontroller of the system. FIG. 19 is a schematic circuit diagram of a Ghz RF transmitter/receiver section 104 which is used during short range pairing of the actuator 10 to a hand held controller. FIG. 20 is a schematic circuit diagram of a Sub Ghz RF transmitter/receiver section 106 which functions for communication of normal, longer range operational commands between the hand held controller and the actuator 10. FIG. 21 is schematic circuit diagram of a secondary or safety processor section 108. Its purpose and operation are described further below. FIG. 22 is a schematic circuit diagram of a power connector 110 of the board 82. FIG. 23 is a schematic circuit diagram of an embodiment of a processor 1 and processor 2 Enable signal. the Master Enable is on if both processors are in agreement of a Sub GHz control command. The circuit includes an AND Gate. If the Master MCU is requesting motion and the safety backup agrees with the motion request this AND gate is enabled and the Master Enable signal is high.

Figure 24:
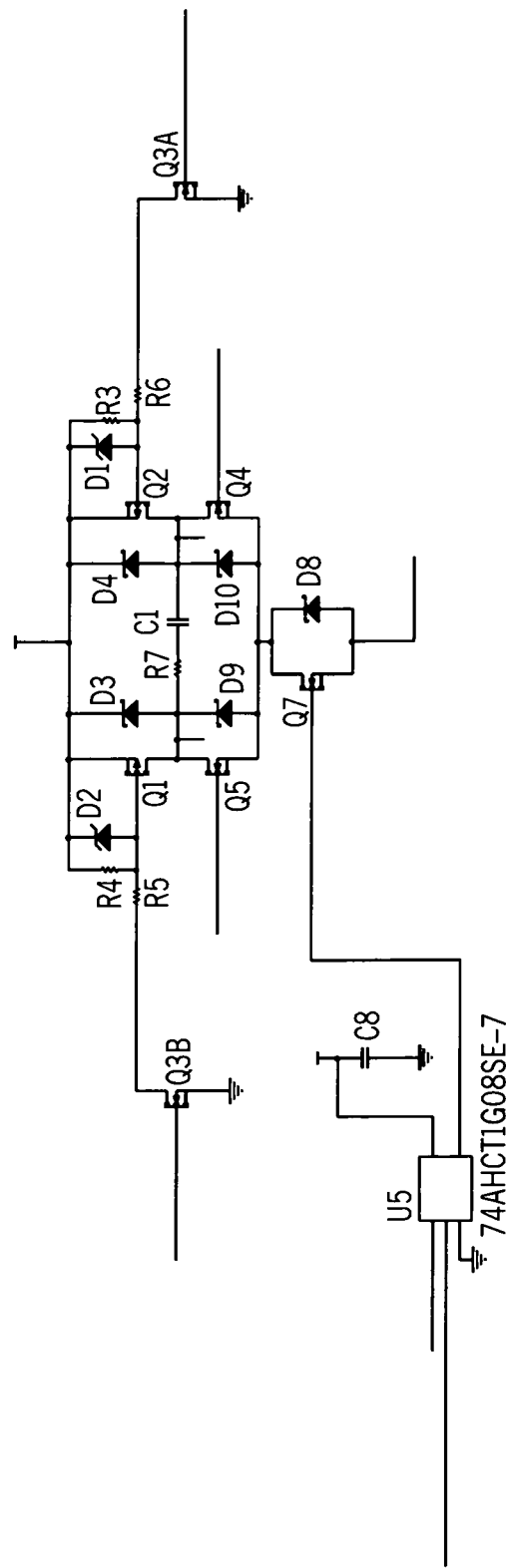
FIG. 24 is a schematic circuit diagram of a first block or section of a Motor Controller Board (PCB) of the system, which outlines the usage of the safety enable.
Figure 25:
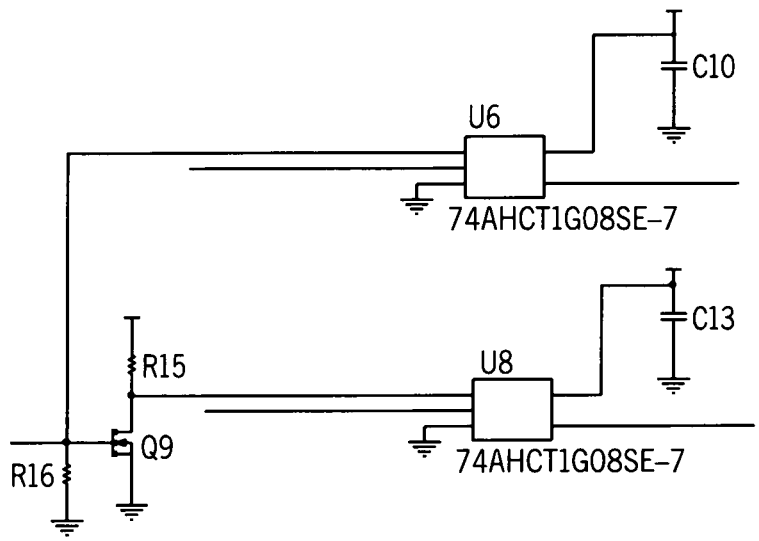
FIG. 25 is a schematic circuit diagram of a second block or section of the Motor Controller Board, which functions as direction control using the safety enable.
Figure 26:
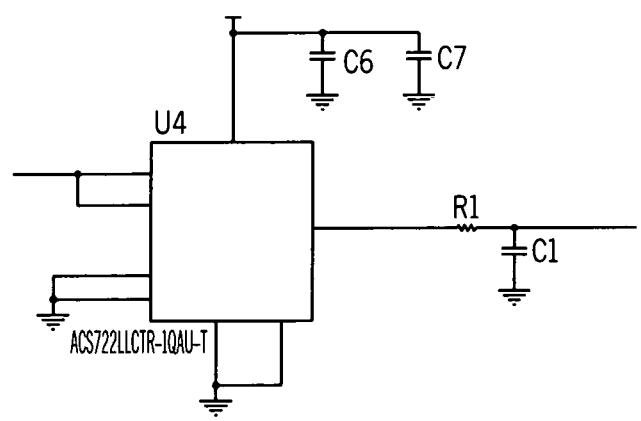
FIG. 26 is a schematic circuit diagram of a third block or section of the Motor Controller Board, which monitors motor current.
Figure 27:
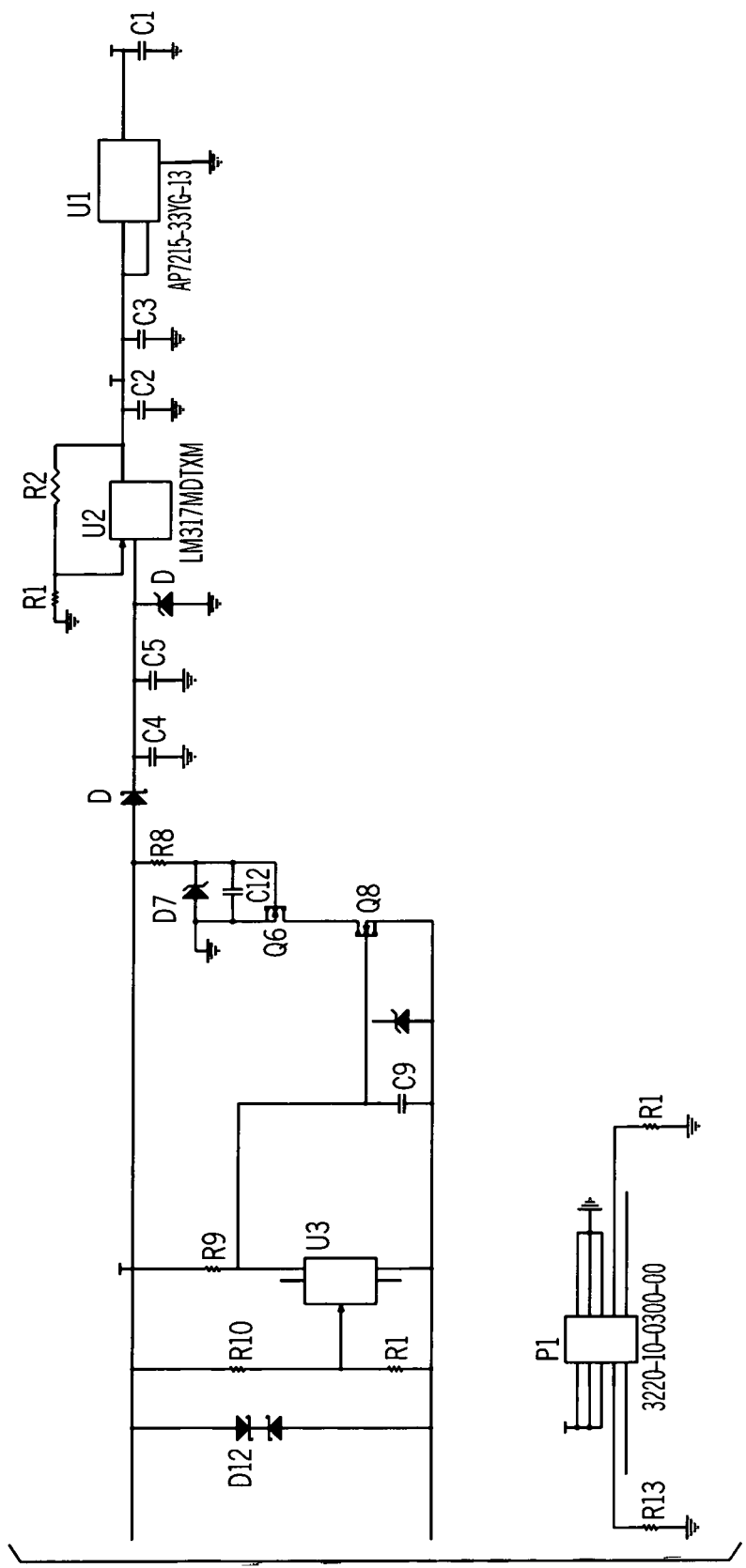
FIG. 27 is a schematic circuit diagram of a fourth block or section of the Motor Controller Board, which performs Reverse Polarity Protection, Load Dump Protection (Over Voltage), and Power Connection functions.

FIGS. 24-27 are schematic circuit diagrams of the blocks or sections of a Motor Controller Board 80 of the system. FIG. 24 is a section which functions as a standard bi direction H bridge for 2 Direction motor control showing the safety enable. The circuit provides motion control where the motor Pulse Width Modulation (PWM) command can only be activated if Enable is active. FIG. 25 is a schematic circuit diagram of a second block or section of the Motor Controller Board, which functions as part of the motor direction control utilizing the safety enable circuit. Enable is required to select motor direction control. FIG. 26 is a schematic circuit diagram of a third block or section, which functions as a motor current sensor. FIG. 27 is a schematic circuit diagram of a fourth block or section, which performs Reverse Polarity Protection, Load Dump Protection (Over Voltage), and Power Connection.

This actuator circuitry 80 and 82 permits uniquely networking one hand held controller to multiple actuators 10. The circuitry has both a Ghz transmitter 104 for pairing distances and a Sub Ghz transmitter 106 for working distances, each of which has a unique address. The hand held controller (not shown) has complementary Ghz and Sub Ghz transmitters with unique addresses. The hand held controller is constructed with a button sequence for requesting that the controller pair with the actuator as follows. The controller sends a Ghz device pair request. This is a low power communication local to the pairing request. The actuator 10 then pairs with the controller. The actuator 10 is programmed to only receive commands from the address of the hand held controller. The controller is programmed for the subject channel to only communicate with this address for the actuator 10 for the assigned buttons in this pairing. True point to point unique communication is achieved. Addressing is saved in non-volatile memory on both the controller and the actuator 10. Importantly, the hand held controller is uniquely pair-able with multiple actuators 10. Each hand held controller button set is assigned a unique point to point address using the above pairing sequence. After pairing, longer range sub Ghz RF communication then uses the point to point address mode to communicate control commands from the hand held controller buttons to the actuator 10.

The actuator circuitry 80/82 includes a dual processor safety mode to ensure that no single point processor motor control failure will activate actuator movement. A first or primary processor 100/102 is interfaced to RF device 106 to receive long range commands. The primary processor 100/102 controls motor 20 direction and speed. A second or secondary processor 108 listens to the same RF device 106 and validates commands. The primary processor 100/102 communicates to the secondary processor 108 the motor commands being executed. The primary processor 100/102 and secondary processor 108 both receive long range, sub-Ghz, RF commands. The secondary processor 108 enables motor 20 operation if the primary commands match secondary commands received from the RF device 106.

The primary processor 100/102 has an output which terminates power consumption after a predetermined period of time where no long range RF command is received. The actuator 80/82 returns to a self centered (spring centered) neutral position if the control commands cease for the predetermined time period.

The Ghz RF module 104 has a high data rate transfer to permit fast, reliable software application update. The processor 100/102 has a bootloader interfaced to the Ghz RF module. A communication protocol allows the Ghz RF module 104 to transmit the actuator operational application (position control: extend, retract, or stop or go to an absolute position) to the processor 100/102. The bootloader mode allows the data from the Ghz RF 104 module to be programmed to the application address range in the processor 100/102. The bootloader allows pass through of application update from the Ghz RF module 104 to the primary processor 100/102 to the secondary processor 108 for update of the secondary processor 108 application.

The hand held controller (not shown) preferably has a processor with the ability to disengage power completely. This stops all power to the controller to strictly limit power consumption and to ensure that no unintended RF commands are transmitted to the actuator 10. The controller has a stop button for disabling the power. The processor includes an output pin which acts as the power down button to removing all power after a predetermined time. A reset button allows power to be re-enabled to the hand held controller. The hand-held controller preferably has a rechargeable battery. The hand-held controller preferably has 6 sets of buttons allowing extend and retract commands to 6 unique actuators. The hand-held controller preferably has LED indicators which inform the operator of battery status and actuator pairing information.

The overall actuator device 10 is preferably substantially rectangular with rounded corners. It is preferably substantially constructed of a rigid metal and/or plastic materials. Although these geometries and dimensions are preferred, it is within the purview of the invention that an actuator 10 can be constructed having other geometries and dimensions.

2. Actuator Having in Line Planetary Gear, Linear Position Sensor, and Single Processor FIGS. 28-32 show the exterior of a second embodiment of an actuator 210 of the invention. The actuator 210 is also efficient and reliable. The actuator 210 has a substantially rectilinear housing 216 that protects and serves as a base for various internal mechanical and electrical components. At a first or distal end 214, a mechanical output rod 236 exits the housing 216 at an aperture there though. A sealed power and control port or connector 248 is shown disposed at the opposite, proximal end 212 of the actuator 210, and provides power to the actuator 210 and in some embodiments may provide control connections. Although the rod 236 is shown to have a curvilinear configuration, it is within the purview of the invention that it may have a rectilinear or other configuration or geometry. Similarly, the power and control port 248 may have various other configurations. As is described further below, this embodiment of the invention includes in-line planetary gears, a linear position sensor, and a single processor.

Figure 33:
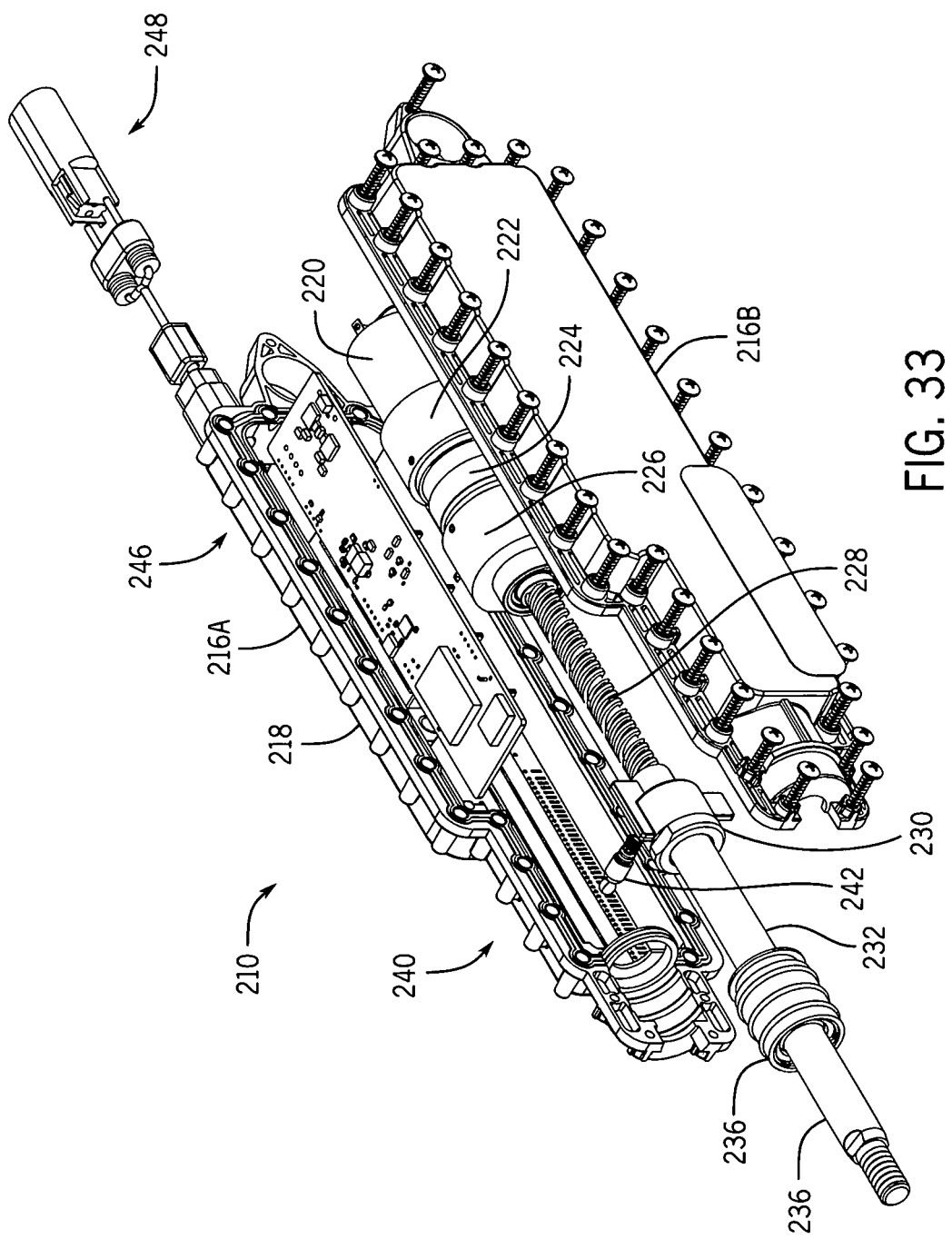
FIG. 33 is a perspective view, partial exploded to show internal components, of the actuator of FIG. 28.
Figure 34:
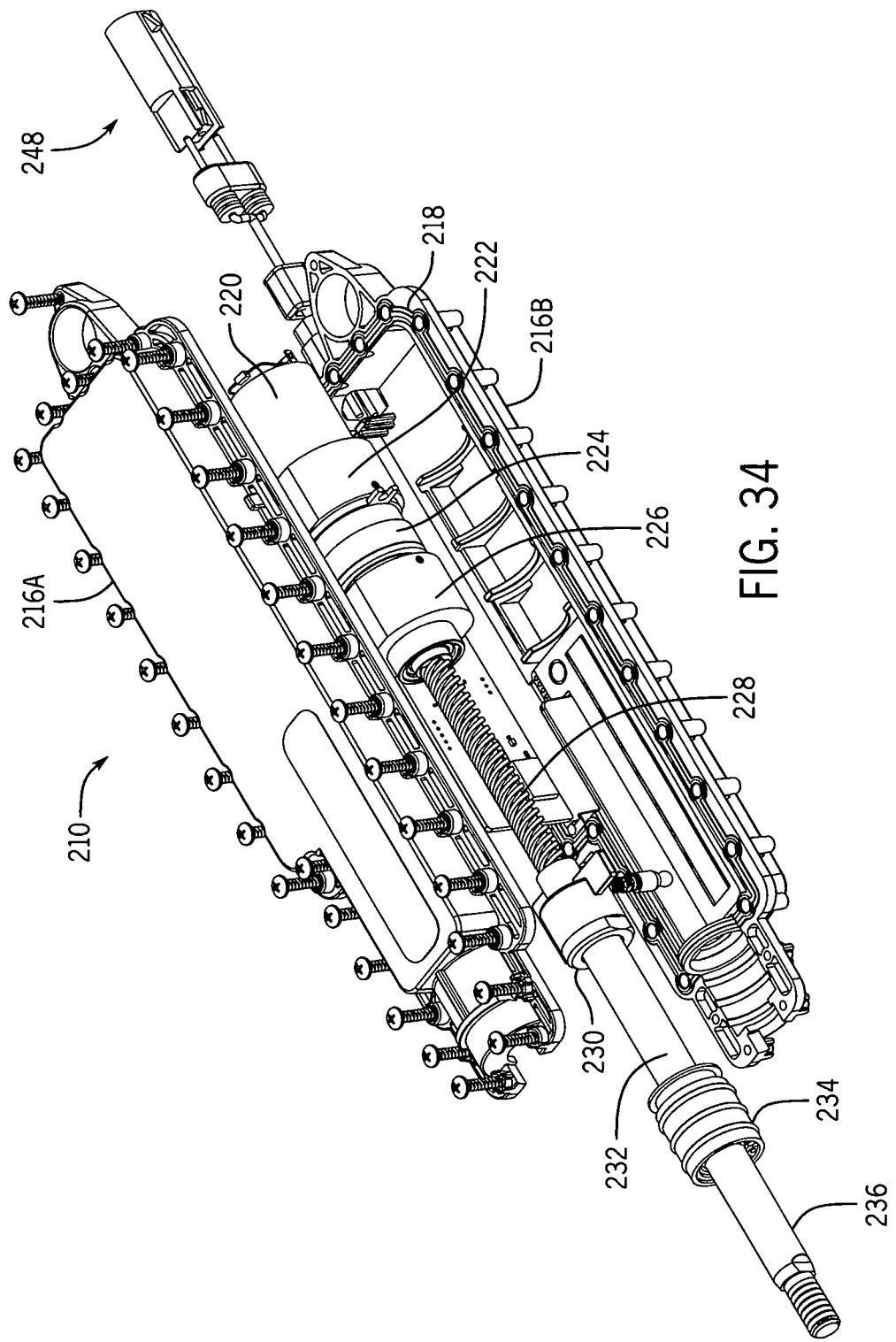
FIG. 34 is a further perspective, partially exploded view thereof.
Figure 35:
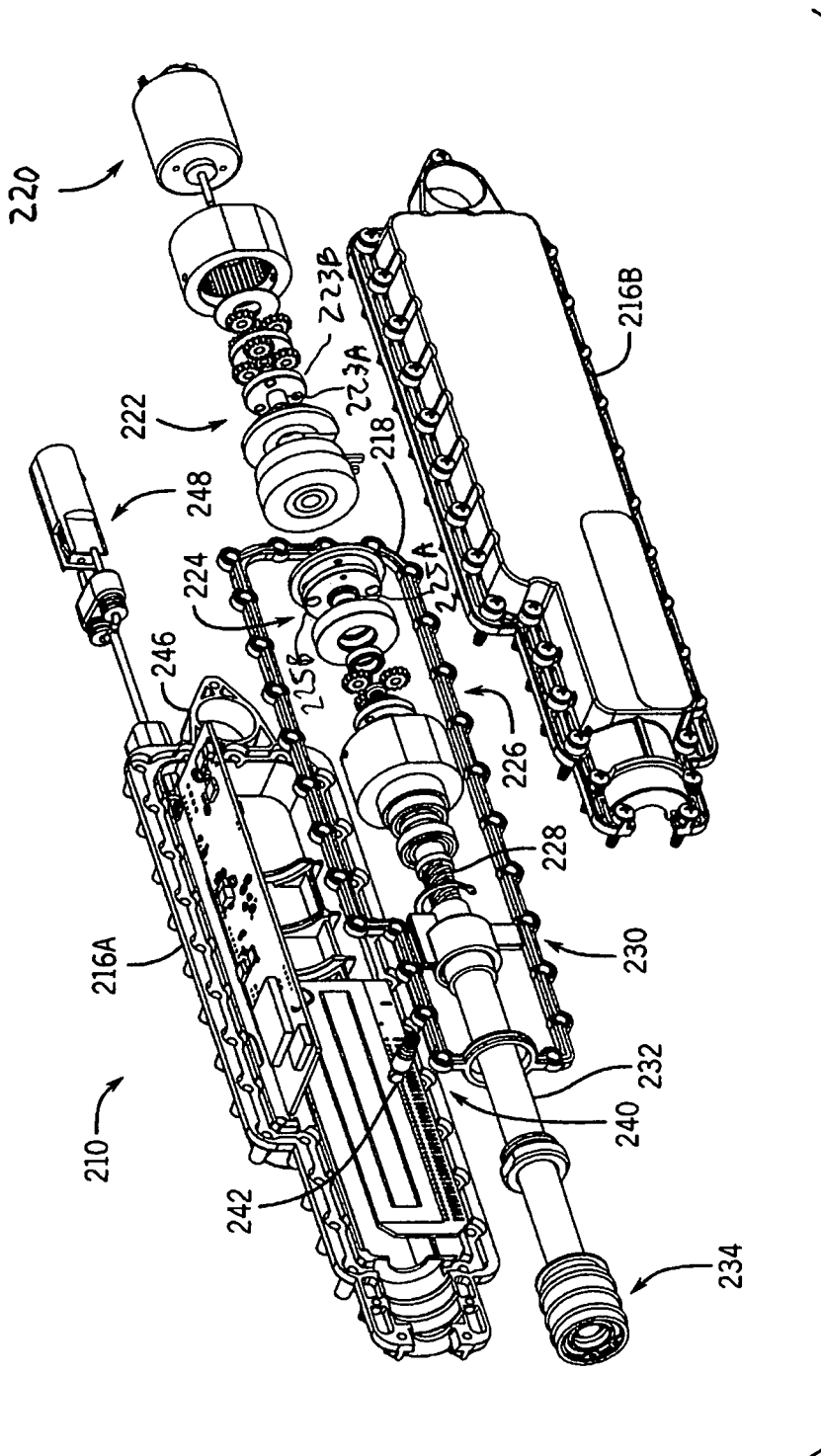
FIG. 35 is a detailed exploded view of the actuator.
Figure 36:
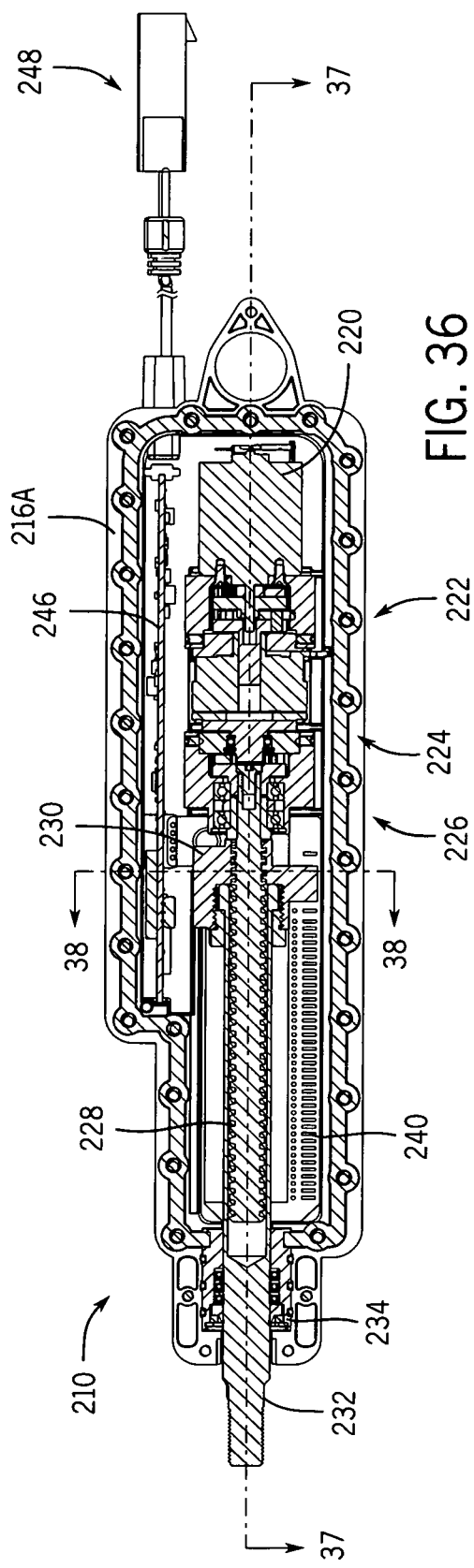
FIG. 36 is a longitudinal, cross sectional view of the actuator, taken at line 36-36 of FIG. 39.
Figure 37:
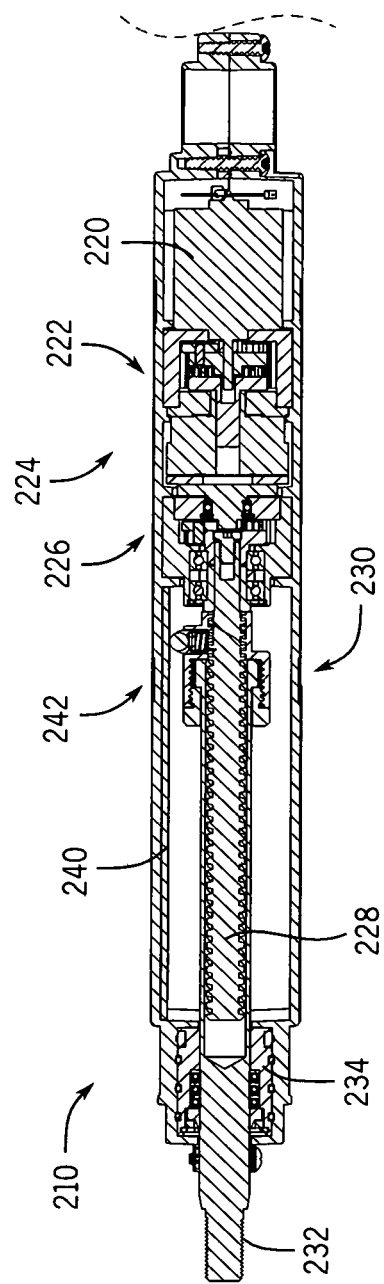
FIG. 37 is a further longitudinal cross sectional view of the actuator, taken at line 37-37 of FIG. 36.
Figure 40:
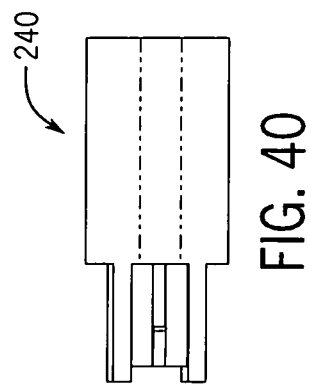
FIG. 40 is a view of an embodiment of a power cable connector of the actuator. The connector omits wires and permits use of any length wire between connector and actuator.
Figure 39:
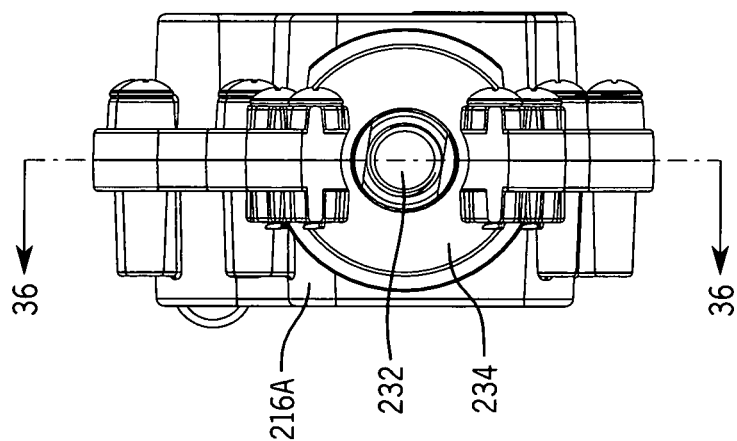
FIG. 39 is another distal end view of the actuator.
Figure 38:
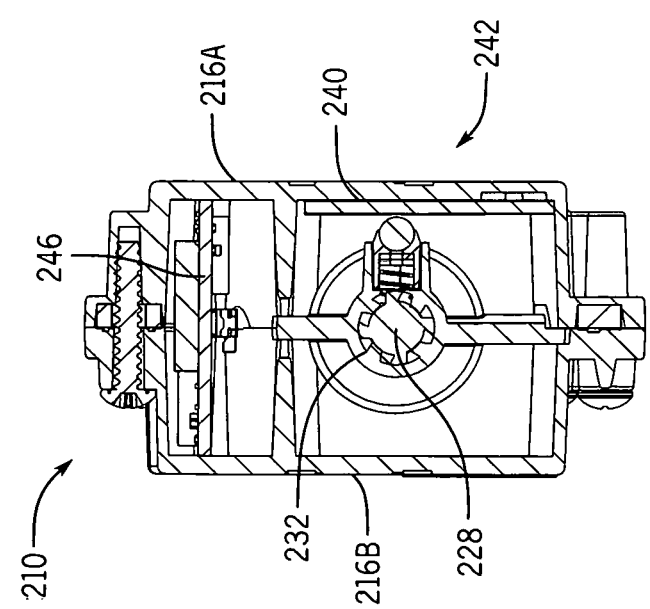
FIG. 38 is a lateral cross sectional view of the actuator, taken at line 38-38 of FIG. 36.

Referring also to FIGS. 33 to 35, the actuator 210 housing 216 preferably consists of two halves 216A and 216B, connected by suitable fasteners, preferably screws, and including a housing gasket 218 disposed between the two halves A and B. Internally, the actuator 210 primarily comprises a motor assembly 220, a first or proximal planetary gear assembly 222, a clutch assembly 224, a second or distal planetary gear assembly 226, a lead screw assembly 228, and an electronic control assembly 246. The power port 248 is electrically communicatively connected to the motor assembly 220 and the electronic control assembly 246. The motor assembly 220 is mechanically communicatively connected to the first planetary gear assembly 222, clutch assembly 224 and second planetary gear assembly 226, which in turn is mechanically coupled to the lead screw assembly 228. As is best shown in the exploded view of FIG. 35, the clutch assembly 224 includes an input shaft 223A with an input plate 223B communicatively connected to the first planetary gear assembly 222 and an output shaft 225A with an output plate 225B communicatively connected to the second planetary gear assembly 226.

Returning to FIGS. 30 and 31, the actuator has a compact, low profile configuration for deployment in a variety of applications. In the most preferred embodiment, the actuator has a preferred length "A" of 11.0 inches, a height "B" of 2.75 inches, and a width "C" of no more than 1.50 inches.

Figure 41:
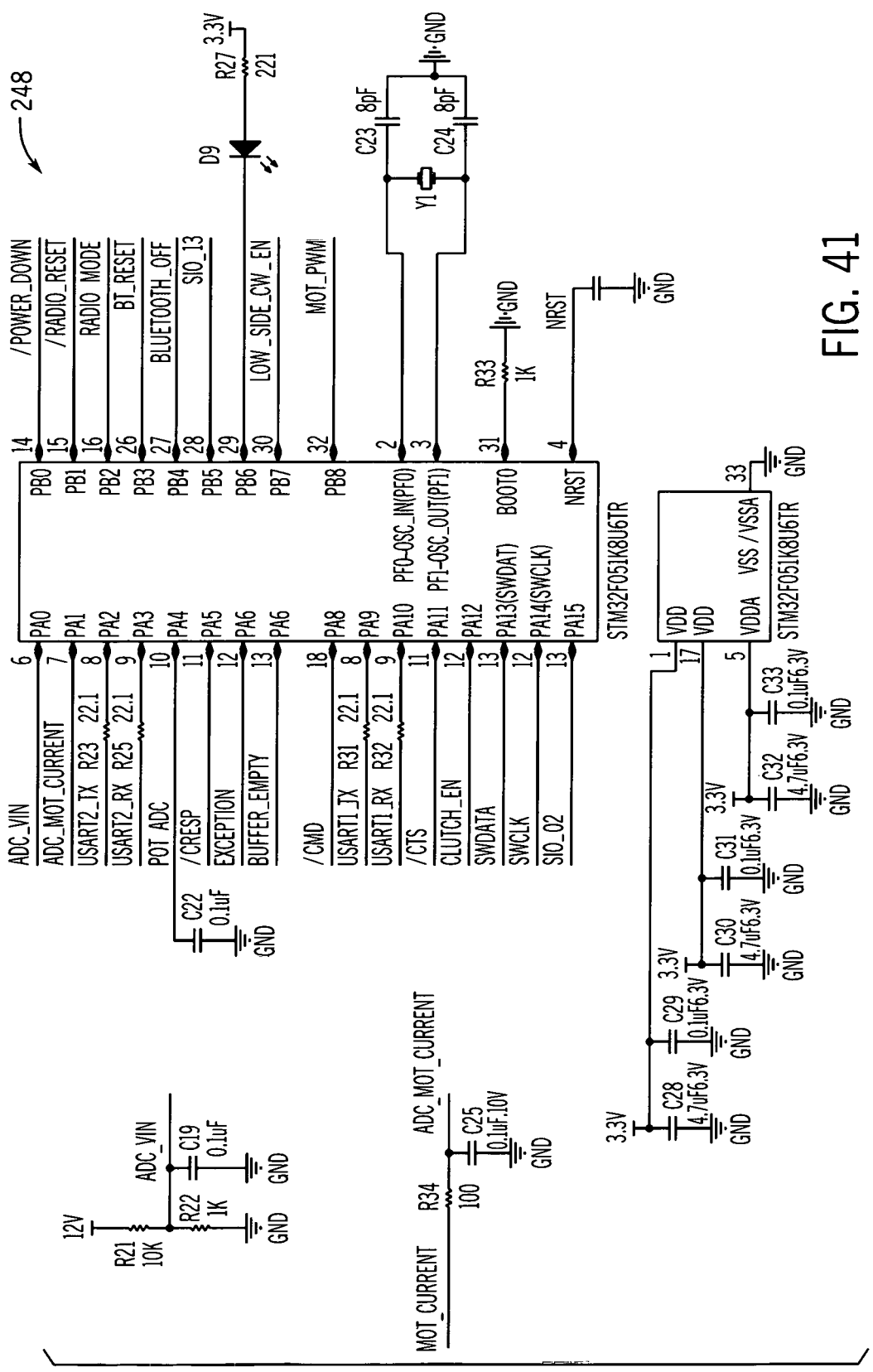
FIG. 41 is a schematic circuit diagram of an embodiment of a main control processor of the actuator.
Figure 42:
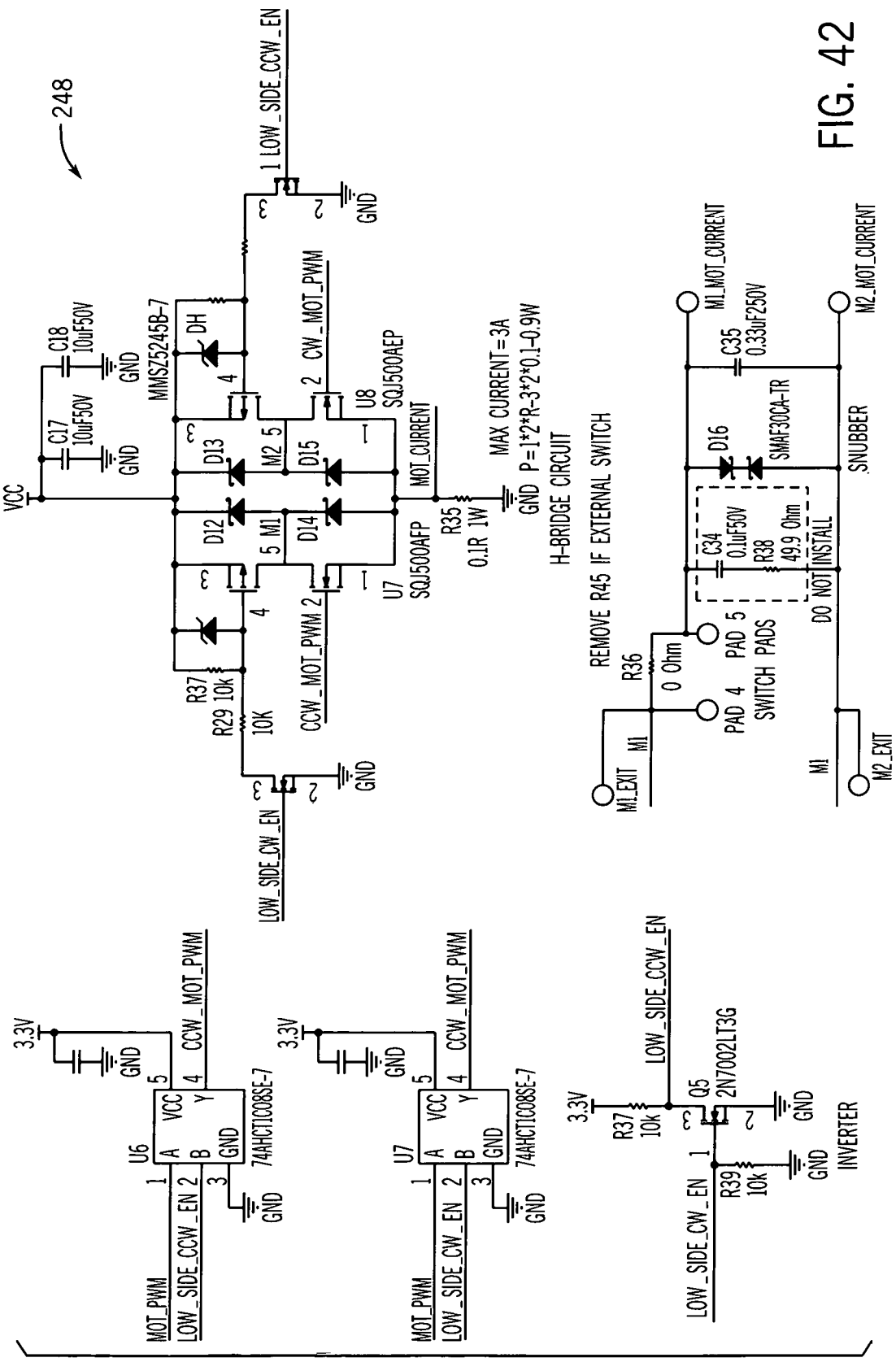
FIG. 42 is a schematic circuit diagram of an embodiment of motor control components of the actuator.
Figure 43:
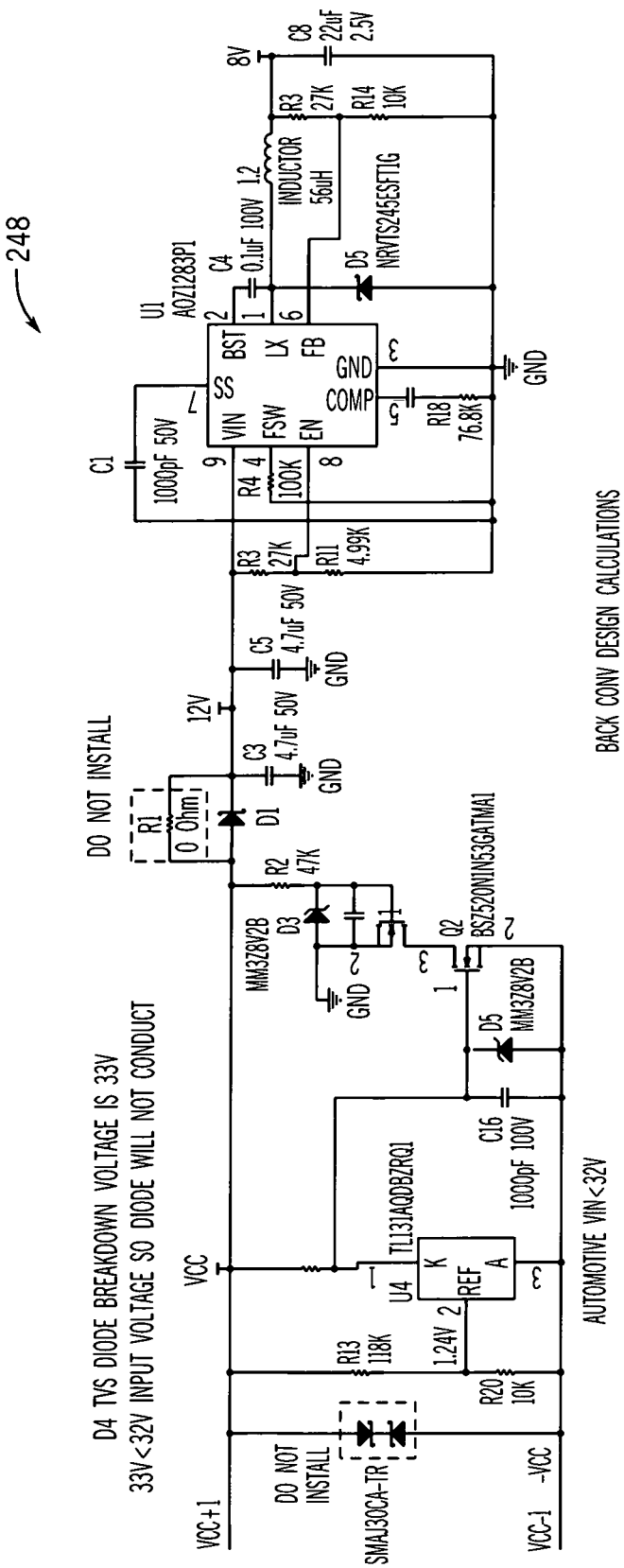
FIG. 43 is a schematic circuit diagram of over voltage and reverse polarity components of the actuator.
Figure 44:
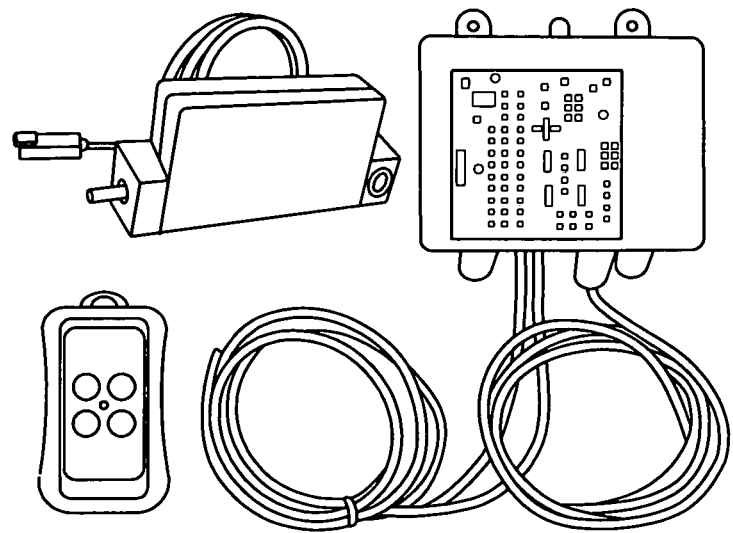
FIG. 44 shows a common two function remote control box and actuator, known in the Prior Art.
Figure 45:
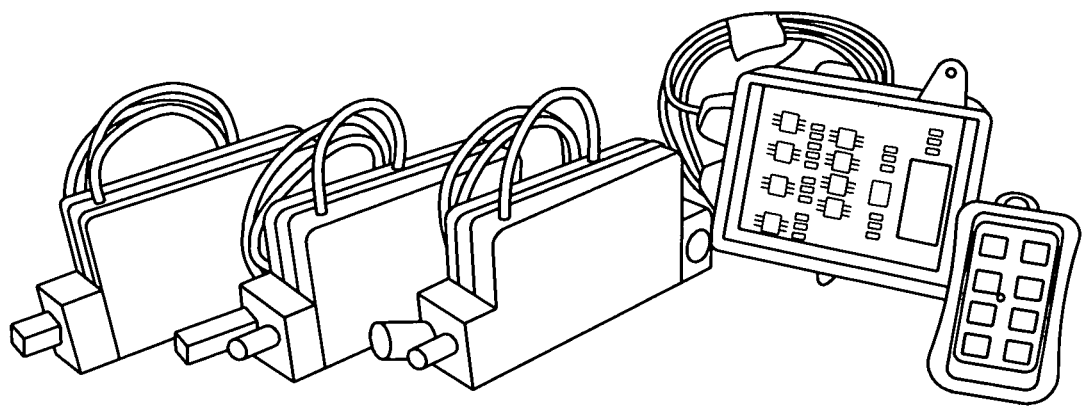
FIG. 45 shows a six function remote, control box, and actuator known in the Prior Art.

The housing 216 is molded to securely support all moving interior components when both halves are sealingly coupled together, preferably by fasteners such as bolts or screws. The housing 216 is preferably constructed of a polymeric material to enable external radio communication with a hand held controller, for example as the twelve function controller 260 shown in FIG. 46. The electrical connector 248 is exposed to the exterior of the housing 216 and supplies power to the motor assembly 220 and top the control electronics 248. The motor assembly 220 transfers rotational motion to the first planetary gear assembly 222 and to the second planetary gear assembly 226 and lead screw assembly 228, via the intervening clutch assembly 224. These assemblies convert rotational motion originally generated by the motor assembly to linear motion which is output to the pushrod 236. The pushrod or tube 232/236 has a sealing bushing assembly 234 coupled to a distal aperture of the housing 12 and is disposed around the rod 236 to environmentally seal the actuator 210. Referring also to FIGS. 41-43, the electronic control assembly 248 is communicatively connected to the motor assembly 220 and enables precise, consistent control of the actuator 210. The control assembly 248 has a single main processor, and provides Radio Frequency (RF) communication, general control, and motor control functions. The control electronics utilizes GHz transmission for processing, software updates, pairing and testing.

Turning to FIGS. 35-40, the combination of the first and second planetary gear boxes 222 and 226 and intermediary clutch assembly 224 provides optimum torque and RPMs at the lead screw assembly 228 to yield optimum force and speed at the push rod 232/236. The push rod 236 moves freely when the actuator 220 is in an Off mode. In the Off mode, power is either removed or a position control signal is not received by the actuator. This permits the user to manually activate a device, such as a hydraulic valve, connected to the output of the actuator 210, if needed. In contrast, if the rod 238 does not move freely, manual operation of the actuated device is not permissible. Free movement of the push rod 236 in turn is provided by the three (3) part drive system of the two gear boxes 222 and 226 and clutch 224. An alternative use of a single gear box is potentially problematic. For example, if a clutch is located between a single gear box and the lead shaft 228, a larger clutch is required. This is a limitation because the full actuator 210 is desired to be less than one and one half (1.5) inches wide so that it may fit into typical applications. Further, a clutch disposed between the motor 220 and a single gear box is very difficult to move when the actuator 210 is in an Off mode. Pushing on the shaft 238 requires a force sufficient to spin all of the gears in a single gear box. Lastly, a large clutch is also more costly. In contrast, the 3-part assembly of the motor 220 to first gear box 222, to clutch 224, and to second gear box 226 permits use of a smaller clutch design 224 and gear boxes 220/226 with limited gear ratios directly connected to the lead screw 228. This permits optimum free movement of the push rod 236.

A linear potentiometer 240 is communicatively connected to a connector nut 230 which connects the lead screw 228 to the push rod 236. The potentiometer 240 acts as a position sensor for extension and retraction of the push rod 236 from and to the actuator 210 by monitoring the nut 230 position. The potentiometer 240 includes a wiper assembly 242 (including a wiper ball, a wiper spring, and a washer/spacer) for interfacing the potentiometer 240 with the nut 230.

In operation, when the hand held controller 260 sends a command, it instructs the actuator 210 where to adjust the nut 230, and therefore pushrod 234, position. The PCB electronics card 246 receive this signal and runs the motor until the nut 230 reaches the desired position as detected by the potentiometer 240 connected to the card 246. When the user deactivates the appropriate button on the controller 260, the actuator 210 powers back to the Off—Neutral position. The Power Back to "Off" arrangement and process is believed to be more reliable then the Spring Back arrangement and process of other embodiments of the present invention. Further, by having the Hand Held 260 send a position the actuator 210 can run to any position desired. This allows the operator to meter the associated, actuated flow valve or other device for adjusting the speed of items such as a winch or the truck bed.

3. A Distributed Network System and Multi-Function Hand Held Controller

The present invention solves the problems inherent in the Prior Art two and six function controller systems. The controller of the present invention provides twelve (12) functions. Such system covers virtually every possible need.

Figure 46:
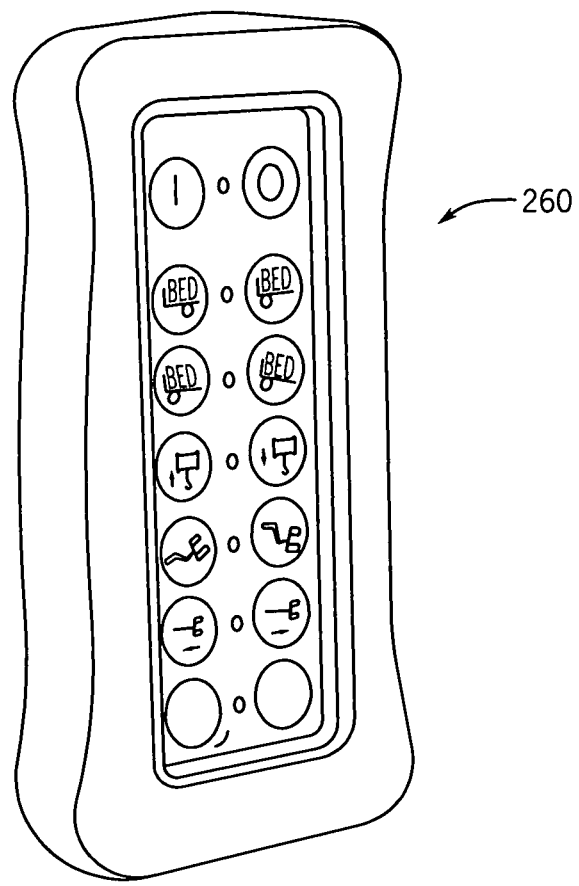
FIG. 46 shows an embodiment of a twelve function, RF, hand held remote controller of the invention.
Figure 47:
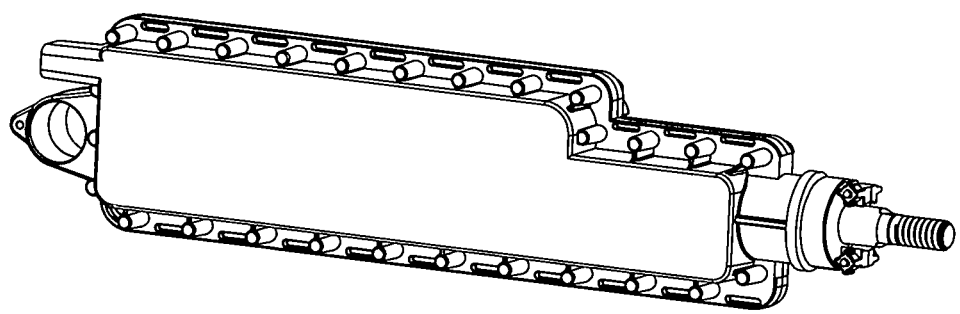
FIG. 47 shows a standard actuator for controlling, for example, the movement of a hydraulic valve, provided by applicants' assignee, PEM.
Figure 48:
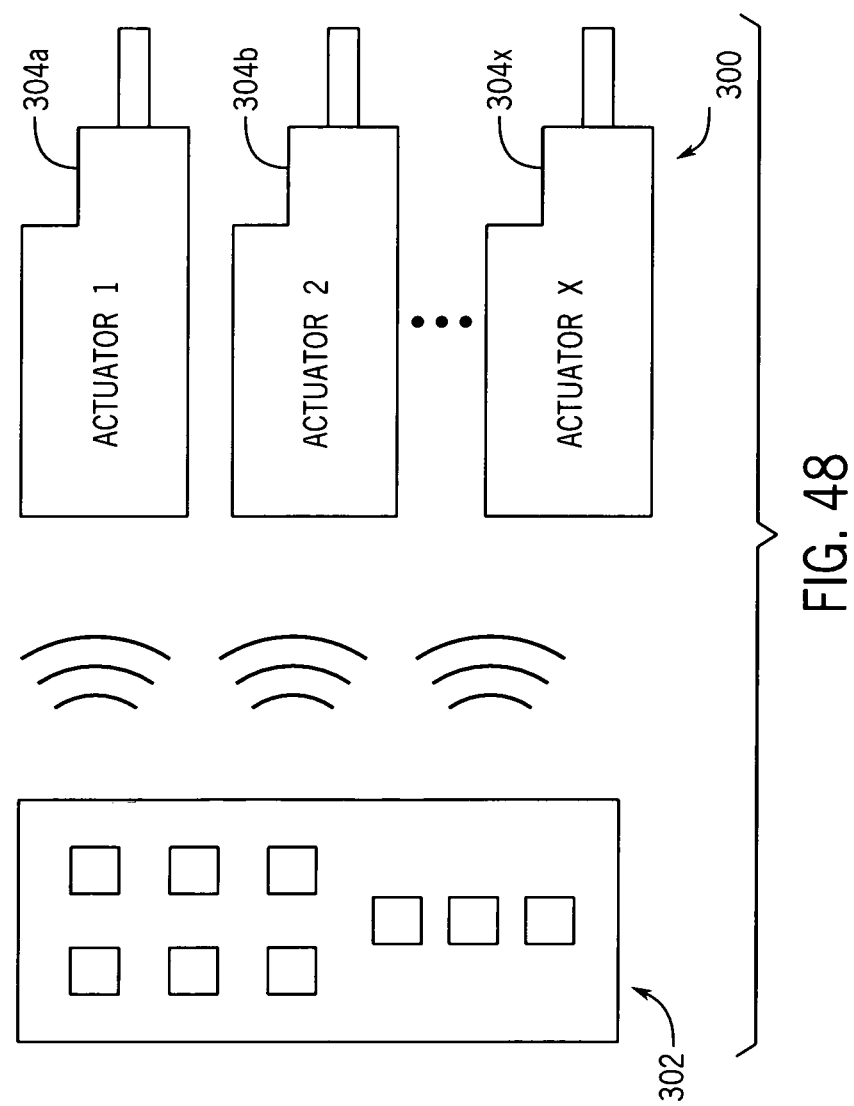
FIG. 48 diagram showing a first implementation of a Direct Connect embodiment of the system of the invention for controlling twelve functions for one actuator or six independent actuators.

Referring to FIGS. 46 and 48, in a first implementation, a Direct Connect implementation 300, a user acquires a single (1) remote 302. The remote can control twelve (12) functions or six (6) different actuators 304. The remote communicates directly to the actuator because every actuator has internal RF communications. If the user acquires a $2^{nd}$ or $3^{rd}$ actuator at any time later, the user simply connects power and pairs the new actuator to the remote. The user can upgrade at any time by acquiring an additional actuator.

Figure 49:
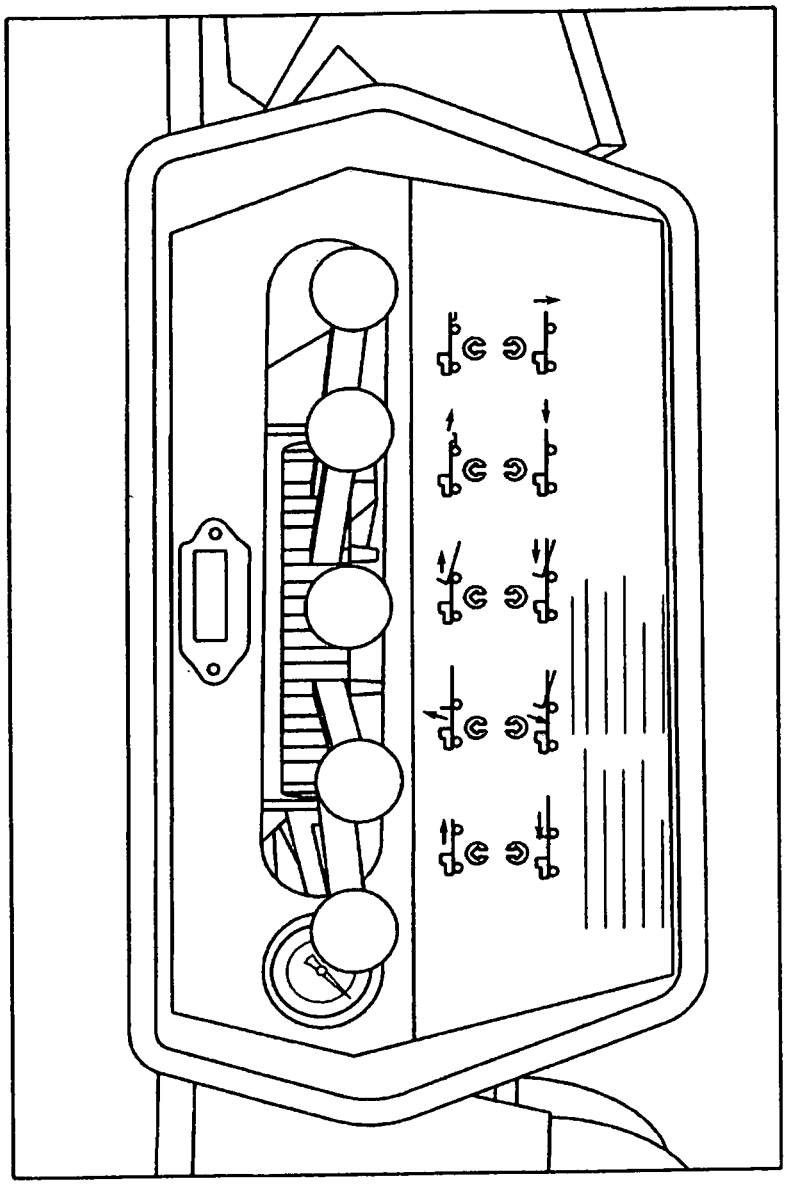
FIG. 49 shows a common hydraulic valve spring controller, known in the Prior Art.

A second benefit of the controller of the invention is position control. This is an added feature permits a user to meter the hydraulic flow speed of actuators under control. This proportional control allows the system to return to a stop position when the hand held button is released. Referring also to FIG. 49, typical hydraulic valves have springs returning the valve to an off position when a handle is released. In the valve shown, all handles are in the center (Off) position. This is from the centering springs in the valve. When a control system is connected to such valve to allow remote up and down handle movement, the existing systems depend on the valve spring to shut the system off. When the Hand Held Controller button is released, the control system removes power to the actuator allowing the actuator and handle to spring to the Off position. A problem is that, over time, the hardware becomes rusty and "sticks" in place. When a user runs the controls by hand, the user is not concerned because they can manually move the handle to the Off position. In a Remote Control System however (i.e. Radio Frequency (RF), the user may be approximately One Hundred (100) feet away so when the user lets up on the Hand Held button to stop motion, the handle does not spring back to Off and the system continues to run. This is a safety and equipment hazard. In contrast, the hand held controller system of the present invention is proportional control and uses the motor and electronics to power back to Neutral/Off. With the addition of the proportional power off control the need to precise actuator position control is available. This allows the Hand Held to command the Actuator to a precise position. To allow no moving components or exposed hardware, this was achieved using a Hand Held Tilt. Tilting 0-90 degree clockwise od Neutral to full extend. Tilting 0 to −90 degrees counter clockwise commands the actuator to run from neutral to full retract.

Figure 50:
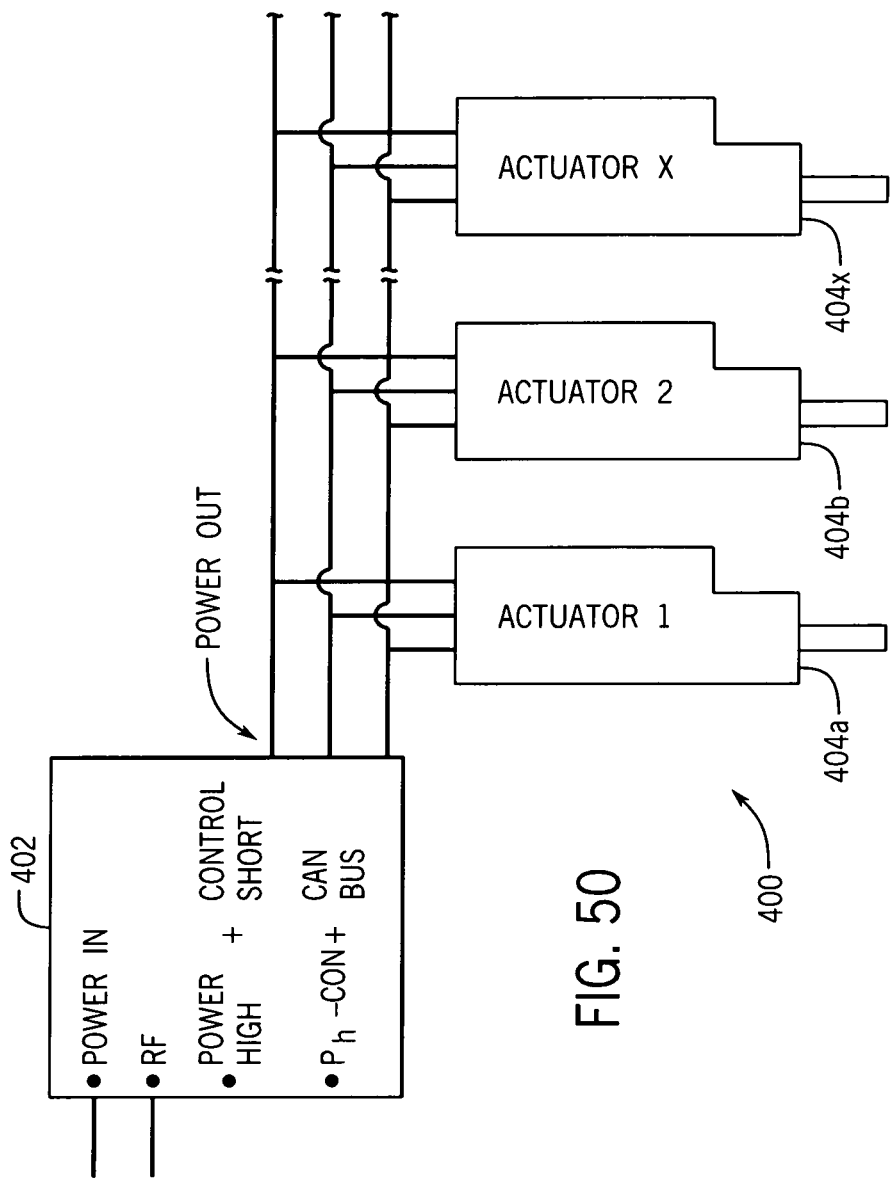
FIG. 50 shows a second, Distributed Network, implementation of a remote control system of the present invention.

Referring to FIG. 50, a second implementation 400 of the controller of the invention utilizes a Distributed Network control system and tilt position control. The first implementation was designed assuming most uses would be to a vehicle with one Hand Held Controller and one Actuator. This direct connect system with no box is very reliable and cost effective. It allows the easy addition of more control if the operator so desires. However, if the user has a typical system of 5 or 6 devices being controlled, the system of the first implementation has extra cost because of the redundant radio present in every actuator. The introduction by Applicant's Assignee (Power Engineering and Manufacturing, Inc. (PEM) of Blaine, Minn. USA) of a Hand Held Controller a Tilt Position Control and an Actuator with powered off and metering flow capability, the user market changed significantly from one (1) actuator being typical to three to six (3 to 6) actuators being typical. In a larger installation, a method is required that allows flexibility of growth like such as is provided by the Direct Connect implementation, however with one (1) radio control box to reduce cost and minimize part duplication.

The system 400 has a control box 402, but one which is very different than existing, Prior Art, boxes. The box 402 of the present invention has a radio receiver and a processor, along with over voltage and reverse polarity control. RF data received on the radio is converted to a CAN bus message and forwarded to the network of devices 404 on the system. This allows the user to add any number of devices to the system without changing the box out. The user can now have growth flexibility and commonality of parts. For Example, in three (3) actuator 404 system, three 3 parts sets, each consisting of a radio, a reverse polarity protection assembly, and over voltage protection, are omitted from the actuators and replaced with just one (1) such set resident in the control box. This advance yields a much lower cost system. Simultaneously, the system remains easy to install, simple to use, and easy to add additional actuators.

An exemplary embodiment of a distributed network control box 402 provided by the invention is for controlling a plurality of remote devices. The box includes a radio receiver/transmitter, a processor, an over voltage controller, and a reverse polarity controller. The radio receiver receives radio signals from and the processor converts the radio signals to a Controller Area Network (CAN) bus message and forwards it to all other devices. The devices are preferably actuators 404, and the control box 402 is adapted to control the actuators 404. Each individual actuator 404 includes a processor, a motor controller communicatively connected to the processor, a position controller communicatively connected to the processor, a motor communicatively connected to the processor, and means to convert CAN Bus commands to actuator control.

A last embodiment of an actuator system within the purview of the invention involves proportional control. The system includes one or more actuators and one hand held remote controller and an RF to CAN interface to convert HH RF commands to the CAN Network of actuators. Each actuator includes a processor connected to the CAN network, and a motor connected to the processor, the processor having proportional power off control of the motor. Each hand held remote controller includes a radio transmitter/receiver, and a processor. The remote controller has tilt for proportional control of the powered off functionality. The remote controller is adapted for position control, and comprises:

a. an element for measuring hand held tilt,
b. an element for measuring buttons being activated;
c. an element for sending radio signals representing hand held position, and
d. an element allowing the controller to be paired to one or more actuators being controlled.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. An actuator, comprising:
an electric motor;
at least one planetary gear assembly connected to the motor, the at least one planetary gear assembly comprising at least one gear;
a clutch assembly connected to the at least one planetary gear assembly;
a lead screw assembly communicatively connected to the clutch assembly;
a control and communication circuit communicatively connected to the motor, the control and communication circuit comprising at least one transmitter/receiver for pairing the actuator to a control device which is disposed remotely from the actuator and for communicating operational control signals between the control device and the actuator;
wherein there are two planetary gear assemblies, a first planetary gear assembly connected to the motor and to the clutch assembly, and a second planetary gear assembly connected to the clutch assembly and to the lead screw assembly; and
wherein the clutch assembly has an input shaft with an input plate communicatively connected to the first planetary gear assembly, and an output shaft with an output plate communicatively connected to the second planetary gear assembly.

2. The actuator of claim 1, wherein the lead screw assembly is connected to the second planetary gear assembly.

3. The actuator of claim 2, wherein a connector nut is connected to a distal end of the lead screw assembly and a push rod is connected to and extends outwardly from the connector nut, the push rod being configured to be connected to an article disposed remotely from the actuator.

4. The actuator of claim 1, further comprising an electronic position sensor communicatively connected to the motor and to the lead screw assembly, whereby the position sensor provides electronic signals to the motor to enable control of the linear position of the lead screw assembly.

5. The actuator of claim 4, wherein the electronic position sensor is a potentiometer.

6. The actuator of claim 1, further comprising a housing enclosing the electric motor, the at least one planetary gear assembly, the clutch assembly, the lead screw assembly, and the control and communication circuit.

7. The actuator of claim 1, wherein the transmitter/receiver is an RF module having an RF control system and controller pairing protocol.

8. The actuator of claim 1, wherein the transmitter/receiver comprises a GHz transmitter/receiver with an address which is adapted to complement an address of the control device for pairing.

9. The actuator of claim 8, wherein the address is saved in non-volatile memory.

10. The actuator of claim 1, wherein the control and communication circuit comprises a single processor, and wherein the single processor: (a) receives motor control commands from, the control device; and (b) controls the speed and direction of the motor based on the motor control commands.

11. The actuator of claim 10, further comprising a proportional power off control, wherein the single processor directs the motor to power back to neutral/off.

12. An electronic linear actuator, which is configured to be remote controllable, comprising:
   a. a DC electric motor;
   b. first and second planetary gear assemblies connected to the motor, each planetary gear assembly comprising a plurality of gears;
   c. a clutch assembly connected between the first and second planetary gear assemblies;
   d. a lead screw assembly communicatively connected to the second planetary gear assembly;
   e. a push rod connected and extending from the lead screw assembly;
   f. an electronic position sensor communicatively connected to the motor and to the lead screw, assembly, whereby the position sensor provides electronic signals to the motor to enable control of the linear position of the lead screw assembly;
   g. a remote control communication circuit comprising a GHz transmitter for pairing the actuator to a control device which is disposed remotely from the actuator for communicating operational control signals between the control device and the actuator;
   h. a processor communicatively connected to the remote control communication circuit, the processor: (a) receives motor control commands from the control device; and (b) controls the speed and direction of the motor based on the motor control commands,
   i. wherein the first planetary gear assembly is connected to the motor and to the clutch assembly, and the second planetary gear assembly is connected to the clutch assembly and to the lead screw assembly; and
   j. wherein the clutch assembly has an input shaft with an input plate communicatively connected to the first planetary gear assembly, and an output shaft with an output plate communicatively connected to the second planetary gear assembly.

13. A direct connect, electronic, linear actuator, which is configured to be remote controllable, and which is configured to be used with other linear actuators controllable from a single controller which is disposed remotely from the actuator, comprising:
   a. a DC electric motor for creating rotary motion;
   b. first and second planetary gear assemblies connected to the motor, each planetary gear assembly comprising a plurality of gears;
   c. a clutch assembly connected between the first and second planetary gear assemblies, wherein the clutch assembly has an input shaft with an input plate communicatively connected to the first planetary gear assembly, and an output shaft with an output plate communicatively connected to the second planetary gear assembly;
   d. a lead screw assembly communicatively connected to the second planetary gear assembly;
   e. a push rod connected the lead screw assembly by a connector nut, and extending outwardly from the lead screw assembly, the push rod being configured to be connected to an article disposed remotely from the actuator;
   f. an electronic position sensor, including a potentiometer, communicatively connected to the motor and to the lead screw assembly, whereby the position sensor provides electronic signals to the motor to enable control of the linear position of the lead screw assembly;
   g. a remote control communication circuit comprising a GHz transmitter/receiver for pairing the actuator to the remote controller for communicating operational control signals between the remote controller and the actuator, the transmitter/receiver having an address which is adapted to complement an address of remote controller for pairing; and
   h. a processor communicatively connected to the remote control communication circuit, the processor: (a) receives motor control commands from the remote controller; and (b) controls the speed and direction of the motor based on the motor control commands, the processor including a proportional power off control, wherein the processor directs the motor to power back to neutral/off.

\* \* \* \* \*